United States Patent
Thomaidou et al.

(10) Patent No.: US 10,915,850 B2
(45) Date of Patent: Feb. 9, 2021

(54) OBJECTIVE EVIDENCE-BASED WORKER SKILL PROFILING AND TRAINING ACTIVATION

(71) Applicant: International Business Machines Corporation, Armonk, NY (US)

(72) Inventors: Stamatina Thomaidou, Mulhuddart (IE); Stefanos Manganaris, Cincinnati, OH (US); Evan D. Braun, Phoenix, AZ (US); Diane Hoffmanner, San Diego, CA (US); Thomas Dekle, Research Triangle Park, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 350 days.

(21) Appl. No.: 15/902,704

(22) Filed: Feb. 22, 2018

(65) Prior Publication Data
US 2019/0258983 A1    Aug. 22, 2019

(51) Int. Cl.
*G06Q 10/06*      (2012.01)
*G06N 20/00*      (2019.01)

(52) U.S. Cl.
CPC ..... *G06Q 10/06398* (2013.01); *G06Q 10/067* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2007/0208575 A1* | 9/2007 | Habichler | .............. | G06Q 10/10 705/7.42 |
| 2011/0307413 A1* | 12/2011 | Dutta | ................... | G06Q 10/105 705/348 |
| 2014/0081715 A1* | 3/2014 | Govindaraman | .. | G06Q 50/2057 705/7.42 |
| 2015/0006259 A1 | 1/2015 | Yoo et al. | | |

(Continued)

OTHER PUBLICATIONS

Mingyu Feng, Using Mixed-Effects Modeling to Analyze Different Grain-Sized Skill Models in an Intelligent Tutoring System, IEEE Year: (2009).*

(Continued)

*Primary Examiner* — Sujay Koneru
*Assistant Examiner* — Mohamed N El-Bathy
(74) *Attorney, Agent, or Firm* — Robert Shatto, Esq.; George Blasiak, Esq.; Heslin, Rothenberg, Farley & Mesiti P.C.

(57) ABSTRACT

Methods, computer program products, and systems are presented. The method computer program products, and systems can include, for instance: parameterizing with training data one or more model that expresses, for a set of historical activities, a known outcome as a function of a plurality of factors, the plurality of factors including one or more activity factor and a worker factor; solving the one or more model to learn by machine learning values of the worker random effect vector associated to the set of historical activities, wherein the values of the worker random effect vector provide an indication of learned worker skill level for respective workers identified by the worker identifiers; and providing, by the one or more processor, one or more output based on the solving.

20 Claims, 13 Drawing Sheets

(56) References Cited

U.S. PATENT DOCUMENTS

| | | | |
|---|---|---|---|
| 2016/0140857 A1 | 5/2016 | Jimenez | |
| 2017/0193420 A1* | 7/2017 | Tiwari | G06Q 10/06398 |
| 2017/0287348 A1* | 10/2017 | Mosher | G06N 5/022 |
| 2018/0046926 A1* | 2/2018 | Achin | G06N 20/00 |
| 2018/0173501 A1* | 6/2018 | Srinivasan | G06N 5/022 |
| 2018/0189691 A1* | 7/2018 | Oehrle | G06Q 10/063 |

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

\* cited by examiner

FIG. 7A ic intelligence (AI)
OBJECTIVE EVIDENCE-BASED WORKER SKILL PROFILING AND TRAINING ACTIVATION

BACKGROUND

The present disclosure relates to artificial intelligence (AI) and computer machine learning and particularly to a computer implemented system for facilitating skill assessment among workers.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed (Samuel).

Worker skills assessment technologies have been observed to be limited in terms of their capacity to accurately estimate worker skill. For example, databases may summarize information on activities in which a worker is involved in but the task of examining the information may be exclusively or nearly exclusively be the responsibility of a manager. The enterprise manager's assessment however can be subjective and susceptible e.g. to emotion and irrational decisions and the manager may be predisposed to the grade the worker that the manager knows or likes the best as the most skilled worker. To the extent that objective appearing factors are available objective appearing factors are subject to manipulation. For example, skills assessments can initially be made irrationally or emotionally, and formulae can be subsequently applied so that one factor supporting the subjective assessment is arbitrarily elevated over another factor that is not in support of the subjective assessment. Because of problems that currently exist with skills assessments training programs tend to be wasteful. Training resources can be expended to train workers that do not need training and workers in significant need of training are not trained.

SUMMARY

Shortcomings of the prior art are overcome, and additional advantages are provided, through the provision, in one aspect, of a method. The method can include, for example: parameterizing, by one or more processor, with training data one or more model that expresses, for a set of historical activities, a known outcome as a function of a plurality of factors, the plurality of factors including one or more activity factor and a worker factor, wherein the one or more activity factor is expressed, for the set of historical activities, with one or more known activity factor coefficient vector associated to the set of historical activities and one or more activity factor random effect vector associated to the set of historical activities, wherein the worker factor is expressed, for the set of historical activities, with a known coefficient vector provided by a set of worker identifiers identifying workers associated to the set of historical activities a worker factor random effect vector associated to the set of historical activities; solving, by the one or more processor, the one or more model to learn by machine learning values of the worker random effect vector associated to the set of historical activities, wherein the values of the worker random effect vector provide an indication of learned worker skill level for respective workers identified by the worker identifiers; and providing, by the one or more processor, one or more output based on the solving.

In another aspect, a computer program product can be provided. The computer program product can include a computer readable storage medium readable by one or more processing circuit and storing instructions for execution by one or more processor for performing a method. The method can include, for example: parameterizing with training data one or more model that expresses, for a set of historical activities, a known outcome as a function of a plurality of factors, the plurality of factors including one or more activity factor and a worker factor, wherein the one or more activity factor is expressed, for the set of historical activities, with one or more known activity factor coefficient vector associated to the set of historical activities and one or more activity factor random effect vector associated to the set of historical activities, wherein the worker factor is expressed, for the set of historical activities, with a known coefficient vector provided by a set of worker identifiers identifying workers associated to the set of historical activities a worker factor random effect vector associated to the set of historical activities; solving, by the one or more processor, the one or more model to learn by machine learning values of the worker random effect vector associated to the set of historical activities, wherein the values of the worker random effect vector provide an indication of learned worker skill level for respective workers identified by the worker identifiers; and providing, by the one or more processor, one or more output based on the solving.

In a further aspect, a system can be provided. The system can include, for example a memory. In addition, the system can include one or more processor in communication with the memory. Further, the system can include program instructions executable by the one or more processor via the memory to perform a method. The method can include, for example: parameterizing with training data one or more model that expresses, for a set of historical activities, a known outcome as a function of a plurality of factors, the plurality of factors including one or more activity factor and a worker factor, wherein the one or more activity factor is expressed, for the set of historical activities, with one or more known activity factor coefficient vector associated to the set of historical activities and one or more activity factor random effect vector associated to the set of historical activities, wherein the worker factor is expressed, for the set of historical activities, with a known coefficient vector provided by a set of worker identifiers identifying workers associated to the set of historical activities a worker factor random effect vector associated to the set of historical activities; solving, by the one or more processor, the one or more model to learn by machine learning values of the worker random effect vector associated to the set of historical activities, wherein the values of the worker random effect vector provide an indication of learned worker skill level for respective workers identified by the worker identifiers; and providing, by the one or more processor, one or more output based on the solving.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 7A depicts visualizations of a worker user interface according to one embodiment;

DETAILED DESCRIPTION

Figure 1:
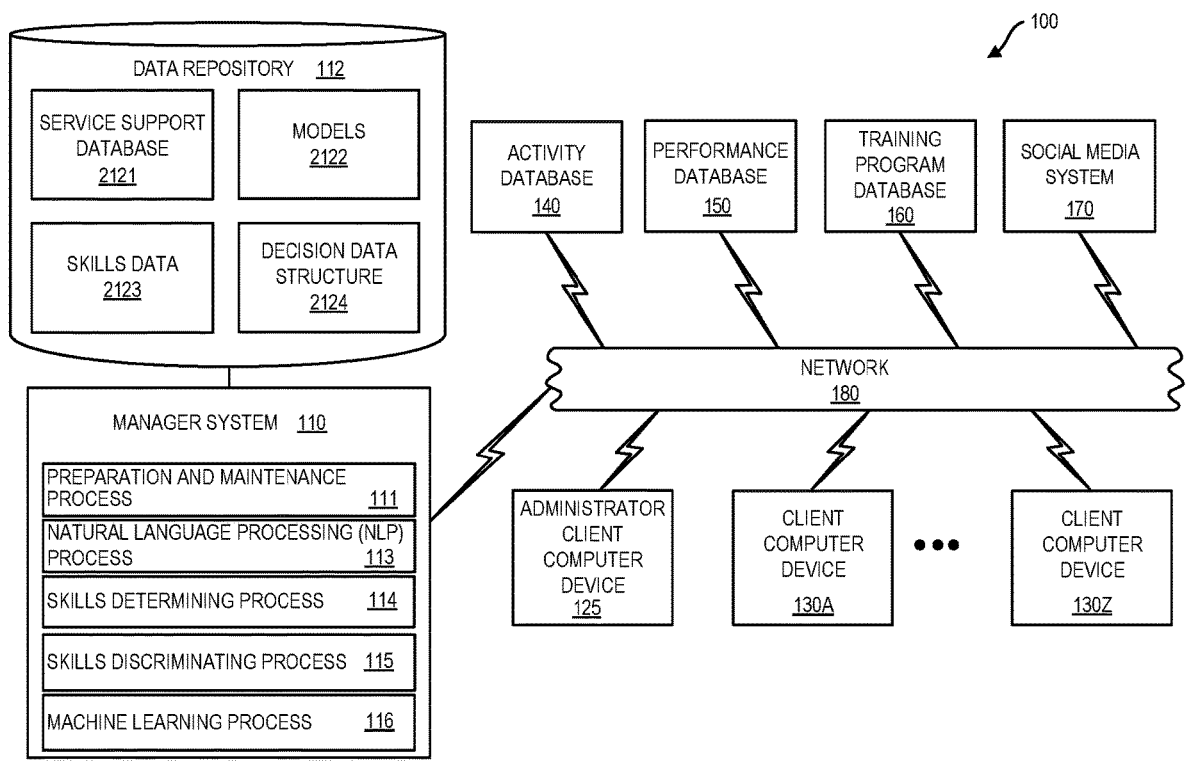
FIG. 1 depicts a system having manager system, client computer devices, and databases according to one embodiment.

FIG. 1 is a block diagram of system 100 in accordance with one illustrative embodiment as set forth herein. In the embodiment of FIG. 1, system 100 can include numerous devices such as computer node based device connected by network 180. For example, network 180 may be a physical network or a virtual network. A physical network can be for example, a physical telecommunications network connecting numerous computer nodes of systems, such as computer servers and computer clients. By contrast, a virtual network can for example, combine numerous physical networks or parts thereof into a logical virtual network. In another example, numerous virtual networks can be defined for a single virtual or physical network. In one example, network 180 can include a combination of one or more physical network and one or more virtual network.

By way of explanation, FIG. 1 depicts an example environment. In one embodiment, system 100 can include a manager system 110 having an associated data repository 112, administrator client computer device 125, client computer devices 130A-130Z, an activity database 140 (e.g. as may be provided by a customer relations management system, CRM), a performance database 150, and training program database 160, and social media system 170. Client computer devices 130A-130Z can be user client computer devices that are client computer devices used by users of system 100 such as, sellers of an enterprise, managers of an enterprise. Client computer devices 130A-130Z can be provided e.g. by smartphones, laptops, smart watches, and/or PCs.

Social media system 170 can include a collection of files including for example, HTML files, CSS files, image files, and Javascript files. Social media system 170 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC).

In one embodiment, manager system 110 can be external to and remote from each of administrator client computer device 125, client computer devices 130A-130Z, one or more social media system 170, and databases 140, 150, and 160. In one embodiment, manager system 110 can be collocated with at least one client computer device of client computer devices 130A-130Z, one or more social media system 170 and/or one or more of the databases 140, 150, or 160.

Activity database 140 can include data that characterizes activities of an enterprise. Activities can include, e.g. production of widgets, sales of IT related goods and services, or any other type of activity. In one embodiment, where an enterprise performs sales activities, activity database 140 can include, e.g. an enterprise sales automation system or an enterprise opportunity management system. In one embodiment, activity database 140 can be provided by a customer relations management (CRM) system.

Performance database 150 can store worker performance data, e.g. incentive data and commission data for each of a plurality of workers. Performance database 150 can be provided by an enterprise as Human Resources (HR) database, in one embodiment.

Regarding training program database 160, training program database 160 can store data on training programs provided and made available by an enterprise.

Manager system 110 can run various processes. Manager system 110 can run preparation and maintenance process 111, Natural Language Processing (NLP) process, skills determining process 114, skills discriminating process 115, and machine learning process 116.

Data repository 112 can include service support database area 2121, models area 2122, skills data area 2123, and decision data structure area 2124.

Embodiments herein recognize that existing technologies for assessing skill of workers is limited. For example, known technologies for assessing skill are often reliant on subjective human perception and are therefore susceptible to error. Workforce managers may use technology based resources for skill assessment, but nevertheless base skill determinations on subjective factors. Skills determinations can be based on emotion, personal preference, intuition, and guesswork. Existing skills determining technologies may infer skills based on activities completed to develop the skills, tests, certifications, and years of experience. However, embodiments herein recognize that such assessments may not speak to the level of skill that is actually demonstrated on the job. Embodiments herein use Artificial Intelligence (AI) including machine learning so that assessments of worker skill are made of objectively. The risk of influence by subjective factors, e.g. intuition being mitigated, e.g. reduced or eliminated. AI technologies employed can include machine learning activity modeling technologies such as mixed effect modeling technologies.

Embodiments herein recognize that existing technologies to assess worker skill do not provide an accurate measurement of the skill level of the worker. Embodiments herein recognize that performance of a worker depends on many more factors than just worker skill. For example, embodiments herein recognize that a worker's performance results can depend on such factors their specific assignment, the clients and the opportunity in their territory, the offerings they focus on, market conditions, seasonal factors, client and deal-specific factors they cannot control, and even luck. Embodiments herein recognize that with current skills assessment technologies, neither a manager nor a worker have a way to infer from the observed performance the latent skills that explain a performance. Was it the worker's skills? Was it the market conditions? Was it just bad luck? What skills should the worker focus on to close the gaps relative to his/her peers and improve his/her performance?

Embodiments herein can provide for accurate learning of worker skill level, can provide for accurate learning of worker skill on an attribute specific basis and isolate factors contributing to a worker's skill level. Embodiments herein recognize that with skill level determined on an attribute specific basis and/or with factors contributing to determined skill level isolated, custom training programs can be established for a certain user to specifically address attribute deficiencies or isolated skill gaps of the certain worker.

Service support database 2121 can be an optimized service support database. In one embodiment, manager system 110 can run preparation and maintenance process 111 to query data of activity database 140, performance database 150, and training program database 160 to provide a service support database 2121, that is optimized to support the parameterization of models, e.g., mixed effect models that may be stored in models area 2122 for use by skills determining process 114 and skills effect quantifying process 115. Manager system 110 running preparation and maintenance process 111 can iteratively query activity database 140, performance database 150, and training program database 160 for updating the service support database 2121. The querying stages can be performed iteratively, e.g. depending on the application on a permanent basis, per minute basis, per hour basis, per day basis, per week basis, per month basis, per quarter basis, or per year basis.

Models area 2122 can store one or more model. In one embodiment, the one or more model can be a mixed-effect model according to one embodiment. In use cases wherein system 100 is used to provide skills determination in respect to worker skill in terms of differentiated skills attributes models area 2122 can store a plurality of models wherein differentiated models are provided for use in skills determination respecting different skill attributes.

Manager system 110 running preparation and maintenance process 111 to populate and maintain data of data repository 112 for use by various processes run by manager system 110 including e.g. predicting examining process 115.

Manager system 110 can run NLP process 113 to process data for preparation of records that are stored in data repository 112 and for other purposes. Manager system 110 can run a Natural Language Processing (NLP) process 113 for determining one or more NLP output parameter of a message. NLP process 113 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 113 manager system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Manager system 110 running skills determining process 114 can parameterize and solve one or model of model area 2122 for determination of skill. In one embodiment, a model stored in models area 2122 that can be subject to parameterization and solving by skills determining process 114 can have the form shown in Eq. 1 is as follows.

$$Y = C1\beta1 + CN\beta N + \varepsilon \qquad \text{(Eq. 1)}$$

Where Y is the vector $Y=(Y1, \ldots YM)$, that specifies respective known outcomes associated with the set of the activities 1 to M, where $Cx\beta N$ are factors ($Fx=Cx\beta x$) affecting the known outcomes, where $Cx$ are respective coefficient vectors $Cx=(Cx1, \ldots CxM)$ specifying known coefficients of the respective factors affecting the outcomes of the outcomes vector $Y=(Y1, \ldots YM)$, and $\beta x$ are random effect vectors specifying the random effect associated to the various coefficient vectors $Cx$ of the various and where E is an error term. For parameterizing a model such as the model set forth in Eq. 1 using training data, manager system 110 running skills determining process 114 can apply training data having the general form indicated below in Table 1.

TABLE 1

| Activity Identifier | Y Known Outcome | C1 Known Coefficient | ... | CN Known Coefficient |
|---|---|---|---|---|
| 1 | Outcome for activity 1 | Coefficient for first factor for activity 1 | ... | Coefficient for worker factor (the worker identifier) involved in activity 1 |
| . | . | . | . . | . |
| . | . | . | . . | . |
| . | . | . | . . | . |
| M | Outcome for activity M | Coefficient for first factor for activity M | ... | Coefficient for worker factor (the worker identifier) involved in activity M |

Table 1 illustrates data for a plurality of activities, i.e., the set of activities 1 to M which activities can be e.g. building widget activities, sales activities, or other activities. The activities can have known outcomes, e.g. delivered at a certain price, at a certain time, deal won or lost. Manager system 110 can obtain data corresponding to Table A e.g. from source support database 2121 and/or from one or more of databases 140, 150, 150. A knowledgebase herein can be regarded to be defined by one or more of database 2121, database 140, database 150, or database 160.

As shown in Table 1, the column "Activity Identifier" can specify an activity identifier, 1 through M, for a respective activity, the column "Y Known Outcome" can specify an outcome for each of the activities 1 through M, the column "C1 Known Coefficient" can specify a known coefficient for a first factor, for each of the activities 1 through M, and the column "CN Known Coefficient" can specify a known coefficient for a worker factor, for each of the activities 1 through M. Embodiments herein recognize that outcomes associated with activities can be in dependence on worker skill and on other possible factors. Thus, in Eq. 1, the factor $FN=CN\beta N$ can be selected to represent a work factor having a work factor coefficient vector and associated worker random effect, and factor $F1=CN\beta 1$ can be selected to represent another factor, and any number of additional factors F2 through FN can be represented in Eq. 1. In Eq. 1 the factor $CN\beta N$ can be regarded to be a worker factor and remaining factors other than $CN\beta N$ can be regarded to be activity factors.

In solving for a parameterized model, manager system 110 can output random effect results vectors, $\beta 1 \ldots \beta N$ which are the identified random effect vectors associated respectively with the factors coefficients $C1 \ldots CN$ specified in the model of Eq. 1. The random effect results vectors can specify random effects indicating strength of effect associated with each coefficient vector $C1 \ldots CN$ including coefficients of factors other than the worker factor FN and coefficients that specify particular workers (of the vector CN). Manager system 110 on solving a model according to Eq. 1 can provide an output vector $\beta N=(\beta NW1, \ldots \beta NWK)$, where the values $\beta NW1, \ldots \beta NWK$ are the learned random effect values associated respectively with the K workers, worker W1 to WK, that are represented in the worker factor coefficient vector CN. On the solving of a model, manager system 110 can output a random effect vector specifying the learned random effect values associated to the different coefficient values for each remaining coefficient vector C1 to CN−1 in the set of factors $F1 \ldots FN$.

In solving for a parameterized model, manager system 110 can output values indicating a relative strength of an effect of a coefficient vector $C1 \ldots CN$, which can be a positive value (e.g. 0.9) indicating a positive effect on an outcome, a negative value (e.g. −0.4) indicating a negative effect on an outcome or a neutral value (e.g. 0.0) indicating a neutral effect. The model as set forth in Eq. 1 having known outcomes and known inputs facilitates supervised machine learning, wherein solution datasets learned by machine learning for use in downstream processes express relationships between the known outcomes and inputs. In one aspect "parameterizing" a model as set forth herein with known outcome and input values can be regarded as training a model with training data. In solving for a parameterized (trained) model, manager system 110 can learn by machine learning values that indicate an effect of specified one or more factors on outcomes. Learned values can be adaptive based on updates to data used for parameterizing a model.

Importantly, output values indicating strength of an effect provide an indication, e.g. based on a sum of absolute values of the learned random effect values whether a specified factor that is modeled by a model is a strong factor (e.g. above a threshold) or a weak factor (e.g. below a threshold). Manager system 110 can be configured so that a weak factor (e.g. as determined by thresholding) can be deleted, e.g. automatically or based on user administrator defined configuration data.

Accordingly, it will be seen that for a model to be designed that is functional to provide useful cognitive artificial intelligence determinations an administrator user need not have extensive background knowledge or perform extensive study of an enterprise being provided with services. Further an administrator user need not have extensive background knowledge or perform extensive study of dataset available for parameterizing a model with training data or an activity being modeled. Rather system 100 can be provided for ease of use and an administrator user can use outputs provided by parameterizing and solving candidate models to guide design of established models. For example, candidate models having candidate factors can be parameterized and solved, and, if a weak (below threshold) random effect is indicated for the candidate factor the factor can be deleted for establishing an established model in which the candidate factor is deleted.

According to features set forth herein a process for modeling candidate factors, solving models with candidate factors and adapting an established model based on examined results can be made automatic or semiautomatic.

Embodiments herein are provided to use in modeling such as mixed effect modeling to objectively learn worker skill level. Embodiments herein provide cognitive determinations of worker skill level which improve on human cognitive determinations of skill level by alleviating reliance on e.g. guesswork and intuition.

Manager system 110 can run skills discrimination process 115 to discriminate a dependence on factor coefficient vectors on skills determined for various workers. Values learned from solving one or more model according to Eq. 1 by running skills determining process 114 can be input to model equations to generate a "learned" model having a predicted output vector for use in identifying particular aspects of a worker's skill. For generating learned models in one embodiment, manager system 110 can apply normalized values for determined random effect values learned by solving of a model. For generating learned models in one embodiment, manager system 110 can solve an adapted model, and input results into equations of the adapted model.

Skills data area 2123 can store skills data of various worker users of system 100, e.g., as updated per a most recent iteration of skills determining process 114. The skills data for a worker in some embodiments includes skills data differentiated by skill attributes. Where the worker has work involving building widgets, the skill attributes can be divided into such categories as speed, quality, and adherence to specification. Where the worker's work involves sales, a skill of a worker can be divided into various skill attributes such as speed, an ability to win business, deal size, revenue, and volume. Referring again to models area 2122, a number of different models can be provided for a given activity type. More specifically, a different model can be provided for each worker skill attribute to be determined by system 100. A skill of the worker can be divided in one embodiment into different skill attributes. Thus, for example, in the case the worker's work involves building widgets, various skill attributes can be provided to include, e.g. the skill attributes of (i) speed, (ii) quality, and (iii) adherence to specifications. In the case the worker's art involves sales, skill attributes can be divided into, e.g. the various attributes of (a) deal size maximization, and (b) winning business (closing), (c) lead identification, (d) lead progression speed, (e) revenue maximization. Further referring to skill data area 2123 of data repository 112 skills data area 2123 can store normalized skill level data that is normalized for facilitation of input into downstream processes such as skills discriminating process 115.

Decision data structure area 2124 can store one or more data structure for support of worker training decisions. In one embodiment, decision data structure area 2124 can store one or more decision table for support of training decisions based on learned skill level (which may be attribute specific according to one embodiment) and/or discriminated skill effect data as set forth herein.

Manager system 110, running machine learning process 116 in one aspect support use of models as are set forth herein e.g. according to Eq. 1 which can be solved for machine learning of values that are indicative of worker skill as well as other effects. Such values according to processes supported by machine learning process 116 can drive decisions and/or data outputs. Manager system 110, using processes supported by machine learning process 116 can iteratively parameterize, solve, and provide one or more output based on solved models. Manager system 110 running machine learning process 115 can support use of mixed effect models that are solved to learn by machine learning relationships between known inputs and outputs. In one aspect manager system 110 running machine learning process 116 provides for machine learning by providing of skills determining process 115 and/or skills discriminating process 116 each of which can be used to drive artificial intelligence (AI) decisions based on observed and iteratively updated datasets. In another aspect manager system 110 running machine learning process 116 can update decision data structures as set forth herein by machine learning so that accuracy and reliability is iteratively improved over time for reduced reliance on resource consuming rules intensive processing. Machine learning processes can be performed for increased accuracy and for reduction of reliance on rules based criteria and thus reduced computational overhead.

Figure 2:
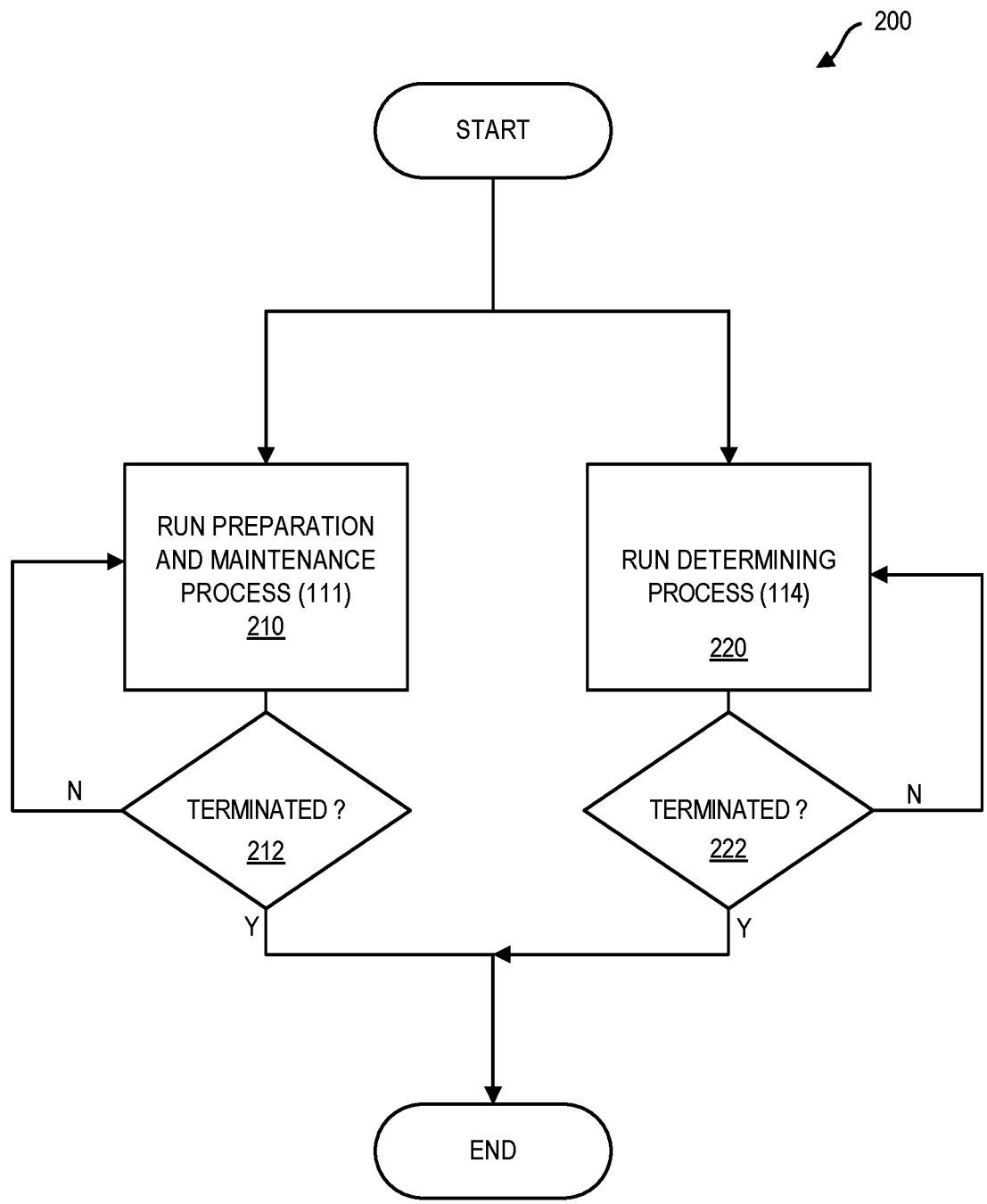
FIG. 2 is a flowchart depicting a method that can be performed by a manager system according to one embodiment.

FIG. 2 is a flowchart illustrating a method 200 that can be performed by manager system 110. At block 210, manager system 110 can run preparation and maintenance process 111 e.g. to populate, prepare, and/or maintain various data of data repository 112 including data. Manager system 110 can run preparation and maintenance process 111 until process 111 is terminated at block 212. At block 220, manager system 110 can run determining process 114. Manager system 110 can run processes 114 iteratively until process 114 is terminated at block 222. In a machine learning aspect of manager system 110 the iterative updating of service support database 2121 as well as database 140 database 150 and database 160 by other processes can refine the cognitive AI decision making by manager system 110 which can provide determinations of increased confidence level as sample sizes of sampled data increase.

For performance of preparation and maintenance process 111, manager system 110 can be configured to automatically query and process data from database 140, 150, and/or 160 and/or can receive data from alternate data sources such as administrator client computer device 125, client computer devices 130A-130Z, social media system 170, and/or one or more additional system.

Figure 3:
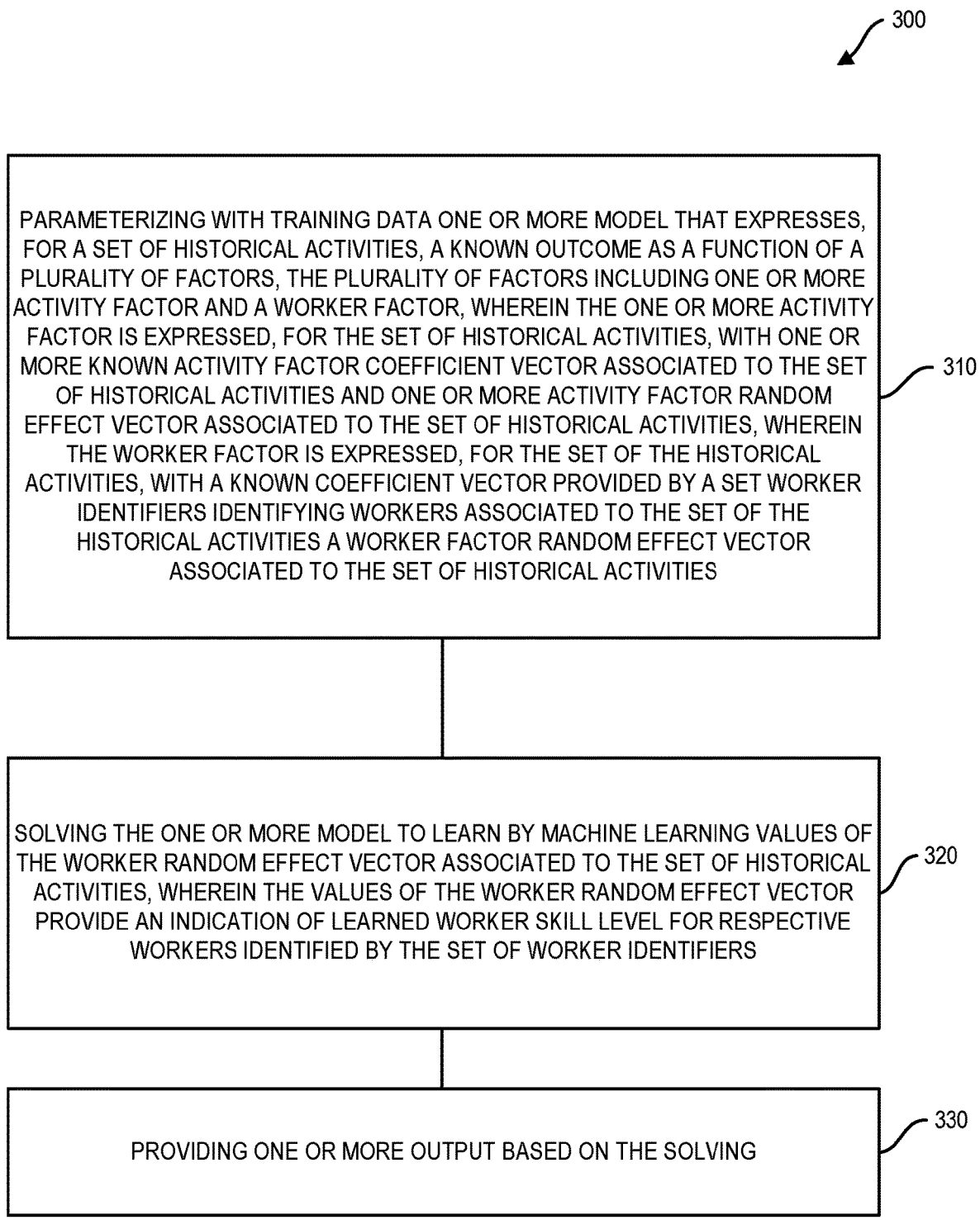
FIG. 3 is a flowchart depicting a method that can be performed by a manager system according to one embodiment.

A method 300 for performance by manager system 110 is set forth in reference to FIG. 3. At block 310 manager system 110 can perform parameterizing with training data one or more model that expresses, for a set of historical activities, a known outcome as a function of a plurality of factors, the plurality of factors including one or more activity factor and a worker factor, wherein the one or more activity factor is expressed, for the set of historical activities, with one or more known activity factor coefficient vector associated to the set of historical activities and one or more activity factor random effect vector associated to the set of historical activities, wherein the worker factor is expressed, for the set of historical activities, with a known coefficient vector provided by a set of worker identifiers identifying workers associated to the set of historical activities a worker factor random effect vector associated to the set of historical activities. At block 320 manager system 110 can perform solving the one or more model to learn by machine learning values of the worker random effect vector associated to the set of historical activities, wherein the values of the worker random effect vector provide an indication of learned worker skill level for respective workers identified by the worker identifiers. At block 330 manager system 110 can perform providing one or more output based on the solving.

Additional aspects of system 100 are described with reference to the flowchart of FIG. 4, which describes a particular embodiment of performance of method 300 by manager system 110 in the context of interoperation between manager system 110 and its associated data repository 112, between manager system 110 and databases 140, 150, and 160, between manager system 110 and administrator client computer device 125, between manager system 110 and client computer devices 130A-130Z, and between manager system 110 and one or more social media system 170.

Figure 4:
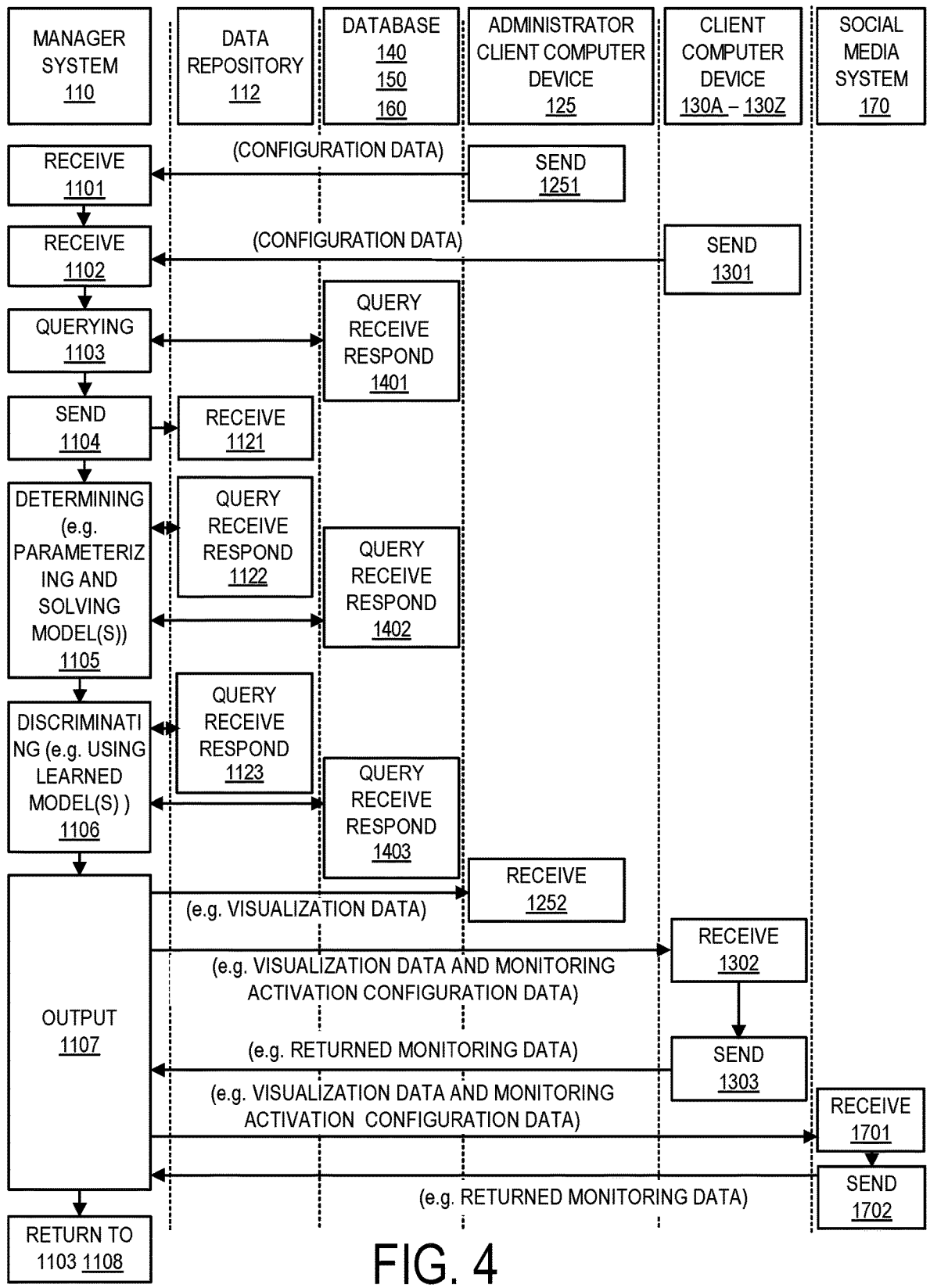
FIG. 4 is a flowchart depicting a method that can be performed by a system having a manager system according to one embodiment.

Referring now to the flowchart of FIG. 4, administrator client computer device 125 at block 1251 can send to manager system 110 for receipt by manager system 110 at block 1101, configuration data that is defined by an administrator user of system 100 using administrator user interface 500. An exemplary administrator user interface 500 is illustrated in reference to FIG. 5.

An administrator user can enter one or more input into administrator user interface 500 to define configuration data, which configures manager system 110 to perform in specific ways in accordance with features that are described herein. Administrator user interface 500 can include a configure area 510 for use in configuring system 100 and view area 520 for use in providing visualizations of outputs, e.g. specifying skill levels of workers. In the exemplary embodiment described in FIG. 5, an administrator user can use model configuration area 511 to select and define models for storage into models area 2122 of data repository 112 (FIG.

1) and which can be solved by manager system 110. Using area 511 a user can e.g. configure models for use of determining skills data on specific skill attributes, add one or more factor of a model, or delete one or more factor of a model. Using area 512, an administrator user can define schedules for data updates, e.g. for defining query periods in which institutional databases such as databases 140, 150, and 160 may be queried for purposes of updating service support database 2121, and schedules for performance of running of skills determining process 114 and/or skills discriminating process 115. Using select/run area 513, an administrator user can select between visualization views and can activate processing for providing selected visualizations. Using monitor selection area 514, an administrator user can make selections for monitoring process that may be performed by manager system 110, e.g. monitoring processes for monitoring the performance of system 100 for use in the alteration of the performance of system 100 and/or monitoring the workers for compliance with training programs assigned to different various workers.

Figure 6:
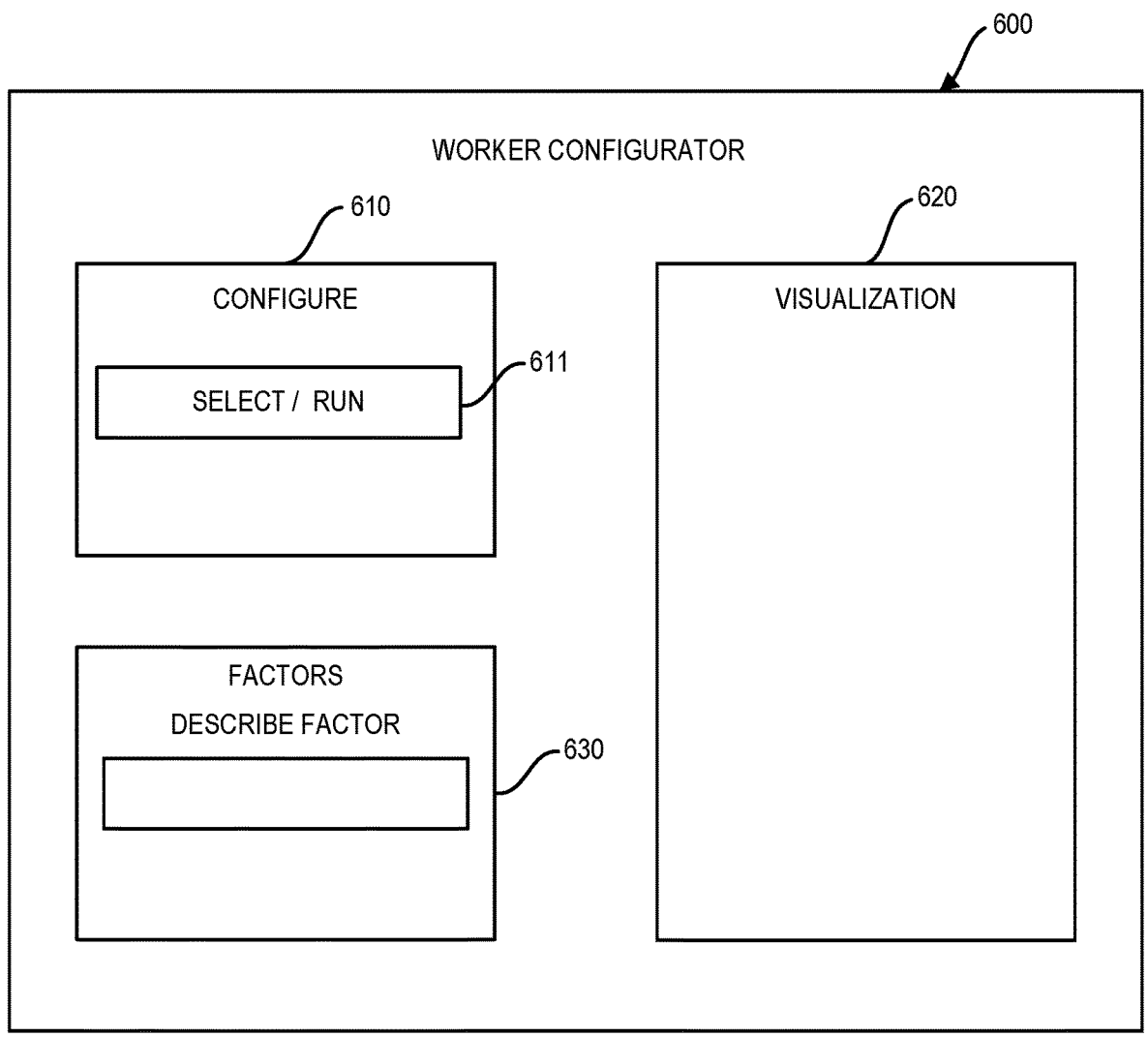
FIG. 6 depicts a displayed worker user interface according to one embodiment.

At block 1301, client computer devices 130A-130Z can send configuration data to manager system 110 for receipt by manager system 110 at block 1102. Configuration data sent at block 1301 can be worker user defined configuration data that is defined by a respective worker user using the respective client computer devices for client computer devices 130A-130Z. FIG. 6 illustrates an exemplary worker user interface 600 that can be used by user workers. Using area 610, a worker user can enter one or more worker user input to define configuration data and visualization area 620 of worker user interface 600 can provide visualization of outputs provided by system 100. Using area 611 a worker user can make selections or visualizations and can activate the performance of processing to provide the selected visualizations.

In one embodiment, a factor that is included in a model can be based on configuration data defined by one or more worker. For example, referring to worker user interface 600 as shown in FIG. 6, a worker can use area 630 to enter data that specifies a factor. For example, it is anticipated that a worker with a relatively low reported skill level may object to the reported data under the theory that a factor not accounted for is the cause of the reported low skill level. The worker may assert for example, using area 630 that a factor such as "customer" or "weather" or "boss" (specifying human individual manager managing the worker) should be included in a model for use in profiling worker skill. Manager system 110 can activate NLP process 113 to return NLP outputs (e.g. topic and/or sentiment classifiers) for text entered into area 630 which may be entered in unstructured form and text entered by an administrator user using area 511 for use by an administrator user in defining models can also be processed by NLP process 113.

Based on the input data input using area 630 by a worker, manager system 110 can, e.g., automatically or based on administrator defined configuration data provide a model specifying the one or more additional factors using data from available databases, e.g. database 2121, database 140, database 150, database 160, and/or external databases (e.g. in the case weather data is to be used for characterization of a factor). In one embodiment, system 100 can be configured so that manager system 110 is restricted from providing the model including the one or more additional candidate factor unless the threshold number of workers enter data indicating that the noted one or more additional candidate factor should be added.

On the receipt of worker user defined configuration data at block 1102, manager system 110 can be enabled to provide the selected visualizations of the respective users of client computer devices 130A-130Z, responsively to the receipt of the configuration data on completion of the subsequently described steps 1104-1108. While in the described example of the flowchart of FIG. 4, receive blocks 1101 and 1102 are depicted as occurring prior to subsequent blocks 1103-1108. It will be understood that system 100 can be configured so that the described configuration data can be received at any stage in the described processing, e.g. intermediate of subsequent to the processing described with reference to blocks 1103-1108, the processing described with reference to any one of the processing blocks 1103-1108 that manager system 110 can respond to the received configuration data in a manner specified by a current processing queue.

Figure 5:
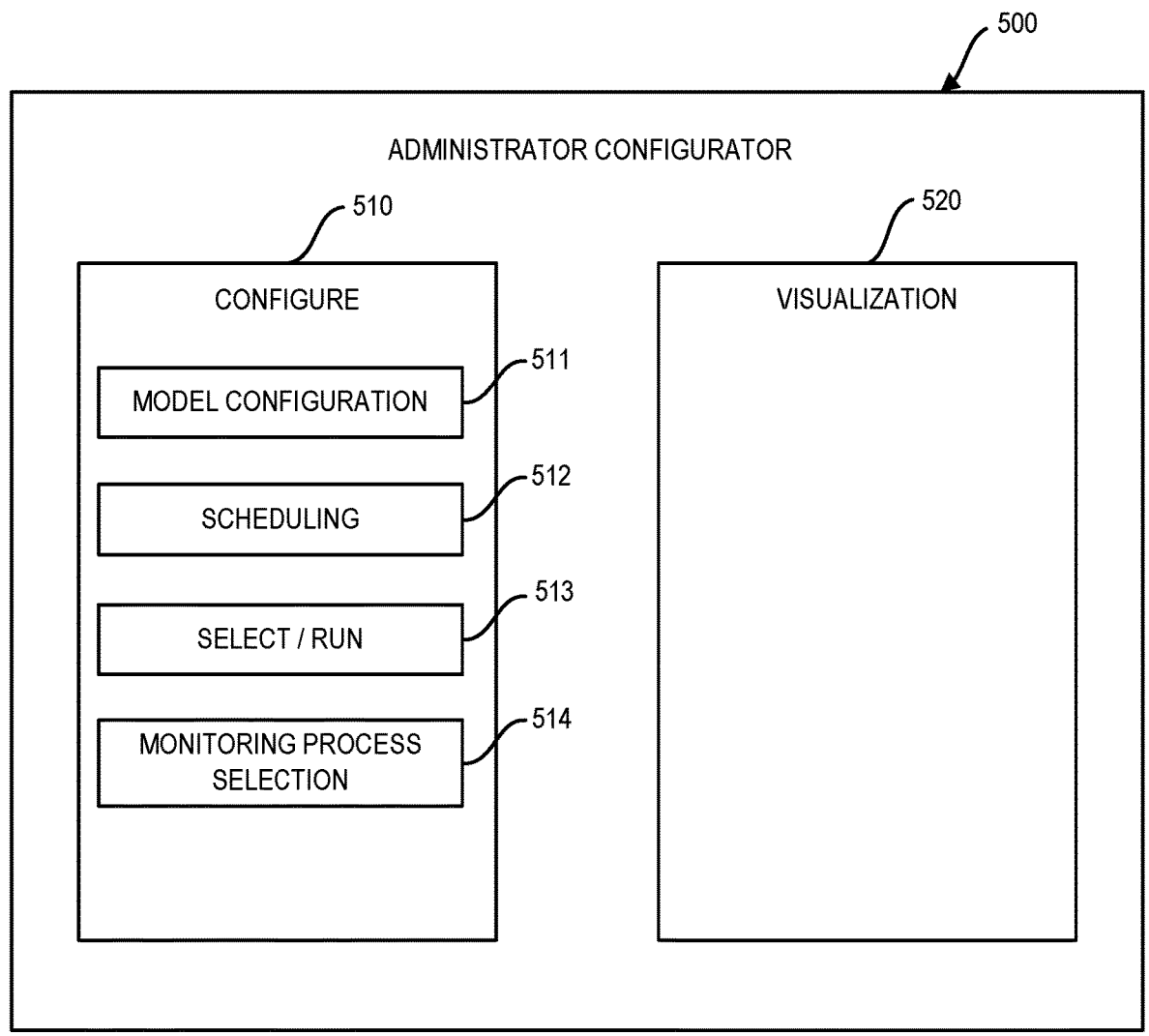
FIG. 5 depicts a displayed administrator user interface according to one embodiment.

At block 1103, manager system 110 can perform querying processing of enterprise databases, e.g. as provided by activity database 140, performance database 150, and training education database 160 (FIG. 1) for purposes of updating the service support database 2121. The querying can be according to a schedule defined by an administrator user using administrator user interface 500 (FIG. 5). Databases 140, 150, and 160 can receive and respond to the various queries at block 1401, returning query data to manager system 110 which can process received data at block 1104 and send processed data to service support database 2121 at block 1121. Database 2121, database 140, database 150 and/or database 160 define a knowledgebase and provide data for parameterization of one or more model as set forth herein. In some use cases activity database 140 can have all data required for parameterization of a model. Whether data of additional databases such as database 150 and/or 160 is accessed can be based on requirements of a factor. For example, a factor may include such factor as workteam association of a worker, and such data can be available in performance database 150 but not in activity database 140 and thus manager system 110 can obtain the data from database. In some use cases, training program participation can be used as a factor of a model and training program participation data can be obtained from training program database 160.

At block 1105, manager system 110 can activate skills determining process 114 e.g. according to a schedule defined by an administrator user using administrator user interface 500 (FIG. 5). Manager system 110 can perform parameterizing with training data one or more model, e.g. one or more mixed effect model. Manager system 110 at block 1105 can parameterize a single model or a plurality of models, e.g. in the case models are provided for determining skills data on multiple skill attributes.

In one embodiment, manager system 110 at block 1105 can parameterize a plurality of models as are set forth in Eqs. 2-6.

$$Y1 = COUNTRY\beta 1 + INDUSTRY\beta 2 + OFFERING\beta 3 + WORKTEAM\beta 4 + WORKER\beta 5 + \varepsilon \quad \text{(Eq. 2)}$$

$$Y2 = COUNTRY\beta 1 + INDUSTRY\beta 2 + OFFERING\beta 3 + WORKTEAM\beta 4 + WORKER\beta 5 + \varepsilon \quad \text{(Eq. 3)}$$

$$Y3 = COUNTRY\beta 1 + INDUSTRY\beta 2 + OFFERING\beta 3 + WORKTEAM\beta 4 + WORKER\beta 5 + \varepsilon \quad \text{(Eq. 4)}$$

$$Y4 = COUNTRY\beta 1 + INDUSTRY\beta 2 + OFFERING\beta 3 + WORKTEAM\beta 4 + WORKER\beta 5 + \varepsilon \quad \text{(Eq. 5)}$$

$$Y5 = COUNTRY\beta 1 + INDUSTRY\beta 2 + OFFERING\beta 3 + WORKTEAM\beta 4 + WORKER\beta 5 + \varepsilon \quad \text{(Eq. 6)}$$

The models described in Eqs. 2-6 can be provided according to the model as set forth in Eq. 1 but can have differentiated values so as to optimize data extraction for different skill attributes. In Eq. 2 through Eq. 6 the factor WORKERβ5 can be regarded to be a worker factor and remaining factors other than WORKERβ5 can be regarded to be activity factors. In one embodiment, system 100 can proactively manage skills development in a sales enterprise environment e.g. by parameterizing and solving models for learning of skill level, and determining training programs for the workers based on the solving. In Eqs. 2-6 Y1 can be a first known outcome vector of the historical activity results of a sales enterprise for a given timeframe, Y2 can be a second known outcome vector of the historical activity results of a sales enterprise for a given timeframe, Y3 can be a third known outcome vector of the historical activity results of a sales enterprise for a given timeframe, Y4 can be a fourth known outcome vector of the historical activity results of a sales enterprise for a given timeframe, and Y5 can be a fifth known outcome vector of the historical activity results of a sales enterprise for a given timeframe.

Y1 and the remaining known coefficient vectors of Eq. 2 can be parameterized for extracting skill attribute values of a first skill attribute, Y2 and the remaining known coefficient vectors of Eq. 3 can be parameterized for extracting skill attribute values of the second skill attribute, Y3 and the remaining known coefficient vectors of Eq. 4 can be parameterized for extracting skill attribute values of the third skill attribute, Y4 and the remaining known coefficient vectors of Eq. 5 can be parameterized for extracting skill attribute values of the fourth skill attribute, and Y5 and the remaining known coefficient vectors of Eq. 6 can be parameterized for extracting skill attribute values for a fifth skill attribute. In the case the worker's art involves sales, skill attributes can be divided into, e.g. the various attributes of (a) deal size maximization, and (b) winning business (closing), (c) lead identification, (d) lead progression speed, (e) revenue maximization.

In the described example, Y1 can be provided for optimizing worker skill attribute extraction relating to (a), Y2 can be provided for optimizing worker skill attribute extraction relating to (b), Y3 can be provided for optimizing worker skill attribute extraction relating to (c), Y4 can be provided for optimizing worker skill attribute extraction relating to (d), Y5 can be provided for optimizing worker skill attribute extraction relating to (e).

For parameterization of Eqs. 2-6, manager system 110 can query one or more of service support database 2121, database 140, database 150, or database 160. For performance parameterization, manager system 110 can parameterize the selected one or more model using data for a defined time period, e.g. defined using area 512 of administrator user interface 500. In general, confidence levels associated with extracted data can normally increase as the sample size of the data is increased.

Y1-Y5 are known vectors of historical activities provided by transaction opportunity results in an enterprise organization for a given timeframe.

For element of deal size maximization (a), Y1 represents the deal size in dollars (which in some embodiments can be expressed in natural log terms, e.g. 4 if the deal is 10,000 dollars, 4.3 if the deal is 20,000 dollars).

Illustrative data for parameterizing with training data the model of Eq. 2 is shown in Table 2. Manager system 110 can obtain Table 2 data from e.g. service support database 2121, one or more of database 140, database 150, or database 160.

TABLE 2

| Activity (Opportunity) | Y1 Known Outcome (Won Deal Size in Dollars) | C1 Known COUNTRY | C2 Known INDUSTRY | C3 Known OFFERING | C4 Known WORKTEAM | C5 Known Worker |
|---|---|---|---|---|---|---|
| 1 | 900 | US | Healthcare | Security Services | B | Anne |
| 2 | 20,000 | IT | Insurance | Security Services | B | Carmen |
| 3 | 15,000 | US | Banking | IOT Services | B | Carmen |
| 4 | 500 | CA | Banking | IOT Services | B | Anne |
| 5 | 100 | US | Banking | Security Services | F | Barry |
| 6 | 200 | US | Healthcare | Security Services | B | Anne |
| ... | ... | ... | ... | ... | ... | ... |
| 3000 | 500 | US | Healthcare | Security Services | B | Carmen |

For parameterizing the model using training data, manager system 110 can apply known historical outcome and known historical coefficient terms to define a matrix configured in accordance with the model. Where the model is a mixed effect model, mixed effect modeling solver software can be used to perform mixed effect model solving. The lme4 package for R provides functions to fit and analyze linear mixed models, generalized linear mixed models and nonlinear mixed models (R is a programming language and software environment for statistical computing and graphics that is supported by the R Foundation for Statistical Computing). WinBUGS is a statistical software in which there is the glmmBUGS package that provides a bridging tool between Generalized Linear Mixed Models (GLMMs) in R and the BUGS language and can perform mixed effect model analysis (WinBUGS is a statistical software package available from the MRC and Imperial College of Science, Technology and Medicine. In one embodiment, for solving mixed effect models, SAS/STAT® Mixed Effect Modeling Software can be used available from SAS Institute, Inc. of Cary, N.C. (SAS/STAT is a registered trademark of SAS Institute, Inc.).

For the element of (b) winning business (closing), Y2 represents the final outcome for the 3000 opportunities (the results values can be referenced by binary "1s" and "0s". For example, a closing business can be represented with a 1 if a deal is won, 0 if a deal is lost).

For the element (c) lead identification, Y3 represents total volume of opportunities identified on a certain business defined timeframe—e.g., on a half year basis or quarter or monthly basis—e.g., Anne has identified in total 100 opportunities in Q1, Carmen has identified in total 200 opportunities in the same Q1 quarter etc.

For the element (d) lead progression speed, Y4 represents number of days to win them (5 days, 120 days, 100 days etc.) for the won opportunities so from the 3000 we might have a vector of 1000 won ones.

For the element (e) revenue maximization, Y5 represents total revenue measured on a certain business defined timeframe—e.g., on a half year basis or quarter or monthly basis—e.g., Anne has contributed in total $100K from her opportunities in Q1, Carmen has contributed in total $200K from her opportunities in the same Q1 quarter etc.

Manager system 110 can parameterize and solve the models of Eqs. 2 through 6 using data according to Table 2 which data can be optimized for different outcome values. In Eqs. 2-6 COUNTRY$\beta$1, INDUSTRY$\beta$1, OFFERING$\beta$3 and WORKTEAM$\beta$4 etc. are factors and c is the error term.

COUNTRY, INDUSTRY, OFFERING, WORKTEAM are coefficient vectors relating Yx to $\beta$1, $\beta$2, $\beta$3, $\beta$4 respectively. $\beta$1, $\beta$2, $\beta$3, $\beta$4, are unknown vectors of random effects or intercepts representing the relation of a grouping expressed with a coefficient. For example, $\beta$1 represents a "positive" or "negative" or "neutral" relationship of the grouping COUNTRY with Yx. $\beta$2 represents a "positive" or "negative" or "neutral" relationship of the grouping INDUSTRY with Yx. $\beta$3 represents a "positive" or "negative" or "neutral" relationship of the grouping OFFERING with Yx. $\beta$4 represents a "positive" or "negative" or "neutral" relationship of the grouping WORKTEAM with Yx.

Further description of the referenced vector coefficients in the particular example is set forth in Table 3.

TABLE 3

| Vector Coefficient | Description |
| --- | --- |
| COUNTRY | The country associated with a sales opportunity, i.e., from which country is the potential client from, thus in which country market the seller tries to close the deal |
| INDUSTRY | The industry associated with a sales opportunity, i.e., what is the main industry categorization of the potential client, thus in which industry market the seller tries to close the deal |
| OFFERING | The product or service that a seller tries to sell through an opportunity |
| WORKTEAM | A grouping of workers that the worker belongs to |

In the described example factor F5=WORKER$\beta$5 is a worker factor, WORKER is the grouping coefficient vector for the worker factor and $\beta$5 is the unknown vector of random effects (intercepts) representing the relation of a grouping expressed with the coefficient WORKER.

Manager system 110 at block 1105 can parameterize the models of Eqs. 2-6 and can run a model solver to determine the unknown random effect vectors $\beta$1, $\beta$2, $\beta$3, $\beta$4, and $\beta$5, wherein $\beta$5 is the worker random effect vector that specifies a worker skill level.

Manager system 110 can return random effect vectors that specify the random effect on a scale of 1.0 to -1.0 the random effect associated with each coefficient value of each coefficient vector. For the COUNTRY grouping where the COUNTRY coefficient vector values include US, IT, CA, manager system 110 for example can return for $\beta$1 the following: one value associated with US, one for IT, one for CA (for example 0.3 for US, 0 for IT, -0.1 for CA etc.).

Manager system 110 can generate solution set mixed effect vectors for each of the models of Eq. 2 through Eq. 6. Given that each of the models of Eq. 2 through Eq. 6 specifies a different known outcome as set forth in reference to (a) through (e) the random effect vector solutions will be provided differently for the various models for the different coefficients. For the WORKER grouping, manager system 110 in reference to the described example can return a random effect vector $\beta$5 for each of the models of Eq. 2 through Eq. 6. Each of the random effect vectors can specify random effect values for each coefficient value (worker identifier) under the grouping.

In the described example, Y1 can be provided for optimizing worker skill attribute extraction relating to (a) Y2 can be provided for optimizing worker skill attribute extraction relating to (b) Y3 can be provided for optimizing worker skill attribute extraction relating to (c) Y4 can be provided for optimizing worker skill attribute extraction relating to (d) Y5 can be provided for optimizing worker skill attribute extraction relating to (e). Thus, parameterizing with training data and solving models of Eq. 2 through Eq. 6 can return worker coefficient $\beta$5 random effects vectors with data according to the illustrative data set forth in Table 4.

TABLE 4

| Model | Description of $\beta$5 mixed effect vector returned by parameterization and solving the model | Description |
| --- | --- | --- |
| According to Eq. 2 (Y1) | Anne: 0.5; Barry 0.0; Carmen (-0.3) | Specifies worker skill level according to attribute (a) (deal size maximization) |
| According to Eq. 3 (Y2) | Anne: 0.6; Barry 0.1; Carmen (-0.1) | Specifies worker skill level according to attribute (b) (deal closing) |
| According to Eq. 4 (Y3) | Anne: (-0.1); Barry (-0.1); Carmen 0.1 | Specifies worker skill level according to attribute (c) (lead identification) |
| According to Eq. 5 (Y4) | Anne: 0.5; Barry 0.0; Carmen (-0.3) | Specifies worker skill level according to attribute (d) (lead progression speed) |
| According to Eq. 6 (Y5) | Anne: 0.4; Barry 0.2; Carmen 0.0 | Specifies worker skill level according to attribute (e) (revenue maximization) |

In addition to the solution data provided that is summarized in Table 4, manager system 110 can determine a confidence level associated with each random effect value and can associate the determined confidence level to the output random effect value e.g. Anne: 0.4; 0.9 where 0.4 is the solution set attribute skill level and 0.9 is the confidence level associated with the skill level. Manager system 110 can determine a confidence level based on a sample size (e.g. number of data points involving Anne). Manager system 110 can also examine data for error indicators in the determination of a confidence level. Manager system 110 can be configured to modify data from a dataset, e.g. a dataset as shown in Table 4 where a confidence level associated with data of the dataset is less than a threshold. For example, where a skill attribute is derived from a small sample set and accordingly has a reduced confidence level, manager system 110 can replace the value with a normalized value indicative of a skill level of the worker of an average skill level. For example, manager system 110 can replace a random effect value having a positive or negative value with a neutral value (e.g. 0.0).

Manager system 110 at block 1105 can remove factors from a mixed effect model in the case that a determined effect of a factor is less than threshold. Embodiments herein recognize that in the solution data, there will be data indicating the overall strength or weakness of a factor; that is, output data output as a result of solving a model will indicate not only data indicating whether an effect is positive or negative, but also the strength of the positive or negative effect. In one embodiment, manager system 110 can be configured to discard from a model factors having a determined random effect (positive or negative) of less than a threshold strength. For discarding a factor manager system 110 can e.g. discard random effect values associated with a factor or re-solve model without the factor. The discarding can be performed on an automated basis. Similarly, manager system 110 can be configured to retain and include in an established model candidate factors that are determined by way of examining a solution data derived by solving a candidate model, factors having an associated qualifying strength above a threshold. Manager system 110 can be configured to discard factors having less than a threshold strength, e.g. automatically or based on selection configuration data defined by an administrator user, e.g. using administrator user interface 500.

Manager system 110 can be configured to discard factors having less than a threshold strength, e.g. automatically or based on factor specifying configuration data defined by one or more worker using area 630 of worker user interface 600 as set forth herein in connection with FIG. 6. Based on the received factors adding data received from one or more worker, manager system 110 can use the noted worker specified model at block 1105 having one or more additional candidate factors can parameterize the candidate model using data from one or more database, e.g., service support database 2121, database 140, database 150, database 160 and can solve the candidate model having the one or more additional candidate factors. Manager system 110 can be configured to retain the one or more additional factors based on an examining of data resulting from the solving of the candidate model indicating a strength of a candidate factor being above a threshold, e.g. automatically or based on administrator user configuration data e.g. defined using administrator user interface 500. Manager system 110 can be configured to discard a candidate factor for providing an established model in the case that an examining of data resulting from solving of the candidate model indicates a strength of the candidate factor being less than a threshold strength. Accordingly, it will be seen that manager system 110 can be configured to add or drop factors that are specified in established models used for profiling worker skills based on crowdsourced data received from a plurality of workers being evaluated using the established model. System 100 can therefore be configured to improve its performance based on crowdsources data e.g. data that specifies observations maintained by a variety of users, or groups of users.

As indicated by query receive/respond blocks 1122 and 1123 (of data repository 112) and query receive/respond blocks 1402 and 1403 (of databases 140, 150, and 160) manager system 110 in the performance of block 1105 and block 1106 can perform multiple queries of data repository 112, one or more service support database 2121, database 140, database 150, or database 160.

On the determination at block 1105 of the β5 mixed effect vector values that characterize skill levels for various workers for various skill attributes, manager system 110 in one embodiment can proceed to block 1106 to provide further refined data in relation respective worker skill attributes. On the determination at block 1105 of the β5 mixed effect vectors that characterize skill levels for various workers for various skill attributes, manager system 110 in one embodiment can proceed to block 1107 to provide one or more output as set forth herein without performing processing according to block 1106.

At block 1106 manager system 110 can run skills discriminating process 115 to derive further refined data on worker skill, which further refined data can be used, for a variety of functions including to derive further refined training decisions. For example, in reference to Table 4 summarizing skill attribute values for various workers, it is seen that Carmen has a negative random effect value for skill attribute (a) deal size maximization. Manager system 110 running skills discriminating process 115 at block 1106 can include manager system 110 applying a learned model to isolate a contribution of one or more activity factor of the plurality of factors as described in connection with Eq. 1-6 on at least one value of the values of a learned worker random effect vector which at least one value can be indicative of a learned worker skill level for one or more of the workers. Based on the data of Table 4, manager system 110 can select a training program for Carmen to address Carmen's gap (weakness) in deal size maximization. However, embodiments herein recognize that it can be helpful to further characterize Carmen's gap in deal size maximization, e.g. to determine whether the gap is tied to a particular coefficient value defining factor, e.g. whether Carmen's gap in deal size maximization is really a result of poor performance in relation to a certain coefficient value of a certain coefficient, e.g. the coefficient value "Banking" under the coefficient Industry. By activating skills discrimination process 115 at block 1106 manager system 110 can provide such a returned decision.

Manager system 110 at block 1106 can generate one or more learned model and can use the one or more learned model to return detailed skills information e.g. by isolating a contribution of one or more activity factor of the plurality of factors as described in connection with Eq. 1-6 on at least one value of the values of a learned worker random effect vector which at least one value can be indicative of a learned worker skill level for one or more of the workers. For generating a learned model, manager system 110 can input learned values (e.g. random effect values, βx yielded by solving a model) into equations defining a model, e.g., a model as set forth in Eq. 1 through Eq. 11.

Manager system 110 according to one embodiment can generate learned models having predicted outcome vectors Y1', Y2', Y3', Y4', Y5'. For example, manager system 110 can generate the learned model having the predicted output vector Y1' which is the predicted outcome vector having M=3000 vector values. According to the described example where there are 3000 activities recorded in a dataset (Table 2) manager system 110 can input solved random effect vector values into the equation Y1(i)=COUNTRYβ1(i)+INDUSTRYβ2(i)+OFFERINGβ3(i)+WORKTEAMβ4(i)+WORKERβ5(i)+ε where i is the activity number. So that a predicted outcome vector Y1' is generated that indicates predicted outcomes in the absence of skill being a factor the input β5 vector (worker random effect) can be normalized value e.g. based on a determined baseline skill attribute values e.g. indicative of a random effect of an average worker. Manager system 110 can input solved random effect vector values into the equations defining the models of Eq. 3-Eq. 7 to generate learned models having the predicted output vectors Y2 Y3 Y4', Y5'.

Manager system 110 for generating a learned model can use an adapted learned model that is adapted from a model subject to parameterizing and solving at block 1105. For example, whereas manager system 110 at block 1105 can parameterize and solve the models having the form of Eqs. 2 through 6, manager system 110 at block 1106 can parameterize and solve adapted models as set forth in Eqs. 7-11.

$$Y1 = COUNTRY\beta1 + MISSION\beta2 + OFFERING\beta3 + INDUSTRY\beta4 + \varepsilon \quad \text{(Eq. 7)}$$

$$Y2 = COUNTRY\beta1 + MISSION\beta2 + OFFERING\beta3 + INDUSTRY\beta4 + \varepsilon \quad \text{(Eq. 8)}$$

$$Y3 = COUNTRY\beta1 + MISSION\beta2 + OFFERING\beta3 + INDUSTRY\beta4 + \varepsilon \quad \text{(Eq. 9)}$$

$$Y4 = COUNTRY\beta1 + MISSION\beta2 + OFFERING\beta3 + INDUSTRY\beta4 + \varepsilon \quad \text{(Eq. 10)}$$

$$Y5 = COUNTRY\beta1 + MISSION\beta2 + OFFERING\beta3 + INDUSTRY\beta4 + \varepsilon \quad \text{(Eq. 11)}$$

The models of Eq. 7 through 11 are according to the form of the models of Eq. 2 through Eq. 6 except are adapted by dropping the "WORKER" factor. Accordingly, solving for the models of Eq. 7 through Eq. 11 provides alternative determined random effect vectors for the coefficient vectors COUNTY, MISSION, OFFERING, and INDUSTRY that are isolated from effects of worker skill. The alternatively determined random effect vectors can be input into the equations defining the models of Eq. 7 through Eq. 11 for generating learned models having predicted (expected) outcome learned model vectors Y1', Y2', Y3', Y4', Y5' which are predicted values absent any affect by worker skill. Methods involving use of adapted models in which factors are dropped for purposes of isolating effects can increase a confidence level associated with provided determinations. For example, while learned models having predicted outcome vectors Y1', Y2', Y3', Y4', Y5' can be generated using the referred to process involving use of baseline skill attribute values, the baseline skill attribute process for generated expected outcomes can be subject to sample loss, e.g. where a skill attribute value cannot be used for the reason of it being based on too small a sample size and having a corresponding low confidence level.

As noted the alternatively determined random effect vectors can be input into the equations defining the models of Eq. 7 through Eq. 11 for providing expected outcome vectors Y1', Y2', Y3', Y4', Y5'. For example, manager system 110 can determine the vector Y1'=(Y1'(1), Y1'(2), ... Y1'(3000)) for the scenario described wherein there can be 3000 activities. Manager system 110 can generate the learned model having Y1' by solving the series of equations Eq. 12 through Eq. 3011 as follows.

$$Y1'(1) = COUNTRY\beta1(1) + INDUSTRY\beta2(1) + OFFERING\beta3(1) + WORKTEAM\beta4(1) + \varepsilon \quad \text{(Eq. 12)}$$

$$Y1'(2) = COUNTRY\beta1(2) + INDUSTRY\beta2(2) + OFFERING\beta3(2) + WORKTEAM\beta4(2) + \varepsilon \quad \text{(Eq. 13)}$$

...

$$Y1'(3000) = COUNTRY\beta1(3000) + INDUSTRY\beta2(3000) + OFFERING\beta3(3000) + WORKTEAM\beta4(3000) + \varepsilon \quad \text{(Eq. 3011)}$$

Manager system 110 can generate learned models having outcome vectors Y2', Y3', Y4', Y5' using the process described for generating the learned model having predicted outcome vector Y1'. Each vector value (Y1'(1), Y1'(2), ... Y1'(3000)) defining the vector Y1' can comprise values Y1'(i) (derived by summing random effect values C1B(i)+C2B(i)+C3B(i)+C4B(i) where i is the number of the activity from 1 to M=3000) that are normalized using the dataset of Table 2 so that the vector values of vector Y1' can be compared to vector values of vector Y1' (Table 2). Manager system 110, e.g. in accordance with processing described in reference to Table 5-8 herein can apply a learned model for performing of discriminating at block 1106. The dataset data of Table 2 enhanced to include the learned model vector values of the predicted outcome vector Y1' (Y1' determined using $\beta(x)$ values derived using Eq. 2-6 or Eq. 7-11) is set forth in Table 5. Manager system 110 can perform processing as set forth in reference to Table 5-8 to isolate a contribution of one or more activity factor of the plurality of factors as described in connection with Eq. 1-6 on at least one value of the values of a learned worker random effect vector which at least one value can be indicative of a learned worker skill level for one or more of the workers.

TABLE 5

| Activity (Opportunity) | Y1 Known Outcome (Won Deal Size in Dollars) | Y1' Predicted Outcome (Won Deal Size in Dollars) | C1 Known COUNTRY | C2 Known INDUSTRY | C3 Known OFFERING | C4 Known WORKTEAM | C5 Known Worker |
|---|---|---|---|---|---|---|---|
| 1 | 900 | 700 | US | Healthcare | Security Services | B | Anne |
| 2 | 20,000 | 25,000 | IT | Insurance | Security Services | B | Carmen |
| 3 | 15,000 | 30,000 | US | Banking | IOT Services | B | Carmen |
| 4 | 500 | 1000 | CA | Banking | IOT Services | B | Anne |

TABLE 5-continued

| Activity (Opportunity) | Y1 Known Outcome (Won Deal Size in Dollars) | Y1' Predicted Outcome (Won Deal Size in Dollars) | C1 Known COUNTRY | C2 Known INDUSTRY | C3 Known OFFERING | C4 Known WORKTEAM | C5 Known Worker |
|---|---|---|---|---|---|---|---|
| 5 | 100 | 90 | US | Banking | Security Services | F | Barry |
| 6 | 200 | 500 | US | Healthcare | Cloud | B | Anne |
| . . . | . . . | . . . | . . . | . . . | . . . | . . . | . . . |
| 3000 | 500 | 450 | US | Healthcare | Security Services | B | Carmen |

Manager system 110 can use the data of Table 5 data including learned model data (and data of corresponding Tables including vector values Y2-Y5, Y2'-Y5' determined using corresponding processes) to identify specific skill strengths and/or gaps of a worker. For example, manager system 110 in one embodiment can use Table 4 data to isolate coefficients affecting Carmen's deal size maximization factor.

Manager system 110 using Table 5 data can generate Table 6 data that isolates data to highlighted an effect of coefficient values for COUNTRY on Carmen's negative random effect in the deal size maximization.

TABLE 6

| Worker | Country | Sum of actual deal sizes (S1) | Sum of predicted deal sizes (S2) | Number of deals |
|---|---|---|---|---|
| Carmen | US | 450,000 | 710,000 | 15 |
| Carmen | IT | 700,000 | 740,000 | 22 |
| Carmen | CA | 120,000 | 120,000 | 8 |

Based on the Table 6 summary data manager system 110 can provide one or more output at block 1107 e.g. to identify one or more training program to address Carmen's primary country specific deal size maximization gap with respect to the US and to address Carmen's secondary country specific deal size maximization gap with respect to IT.

Manager system 110 using Table 5 data can generate Table 7 that isolates data to highlight an effect of Industry on Carmen's negative random effect in the deal size maximization skill attribute.

TABLE 7

| Worker | Industry | Sum of actual deal sizes (S1) | Sum of predicted deal sizes (S2) | Number of deals |
|---|---|---|---|---|
| Carmen | Healthcare | 550,000 | 710,000 | 14 |
| Carmen | Insurance | 250,000 | 640,000 | 21 |
| Carmen | Banking | 470,000 | 220,000 | 10 |

Based on the Table 7 summary data, manager system 110 can provide one or more output at block 1107 e.g. to identify one or more training program to address Carmen's primary Industry specific deal size maximization weakness with respect to Insurance and to address Carmen's secondary Industry specific deal size maximization weakness with respect to the Healthcare.

Manager system 110 using Table 5 data can generate Table 8 that isolates data to highlight an effect of Offering on Carmen's negative random effect in the deal size maximization skill attribute.

TABLE 8

| Worker | Offering | Sum of actual deal sizes (S1) | Sum of predicted deal sizes (S2) | Number of deals |
|---|---|---|---|---|
| Carmen | Security | 470,000 | 550,000 | 10 |
| Carmen | IOT | 350,000 | 700,000 | 25 |
| Carmen | Cloud | 440,000 | 320,000 | 10 |

Based on the Table 8 summary data, manager system 110 can provide one or more output at block 1107 e.g. to identify one or more training program to address Carmen's primary Offering specific deal size maximization weakness with respect to IOT and to address Carmen's secondary Industry specific deal size maximization weakness with respect to the Security.

Manager system 110 for each coefficient value (coefficient values for COUNTRY, INDUSTRY, OFFERING and can determine a dissimilarity score S2-S1 (the difference between predicted and actual outcome values). Manager system 110 can provide a list of factors according to the dissimilarity scoring. Manager system 110 in an illustrative embodiment can provide a prioritized list such as the prioritized list: 1. Industry—Insurance, 2. Offering—IOT services, 3. Country—US, . . . where the items of the prioritized lists are identified as the specific coefficient values having the greatest impact on the user.

In one embodiment, manager system 110 can encompass, within a prioritized list, coefficients derived using learned model data derived using additional outcome vectors Y2-Y5 and predicted outcome vectors Y2'-Y5'. Thus, a prioritized list of coefficients can conceivably include such form as 1. Industry—Insurance [deal size maximization Y1], 2. Industry—Insurance [closure lead time Y4], 3. Offering—IOT services.

In one embodiment, manager system 110 for identifying skill gaps for identification of a training program can be configured to be restricted from examining data specifying one or more areas of strength of a worker. Table 4 depicts lead identification is a strength of Carmen (random effect positive factor). Thus, for identification of gaps in Carmen's skill attributes, manager system 110 can exclude lead identification data from data used for gap identification. According to one method, manager system 110 can restrict data for analysis to lowest K skill attributes of a worker. For example, where K=2, the dataset of focus for identification of Anne's skill gaps would include the dataset for revenue maximization, where Anne is strong because revenue maximization is the least positive strong area for Anne.

At block 1107, manager system 110 can provide one or more output. The one or more output can be in dependence on and in response to the determining at block 1105 and/or the discriminating at block 1107. The one or more output can include one or more output to particular visualization in area 520 of administrator user interface 500 as shown in FIG. 5 or worker user interface 600 as described with reference to FIG. 6. Providing one or more output at block 1107 can include manager system 110 sending a communication for receipt by administrator client computer device 125 at block 1252 and/or one or more communication for receipt by client computer devices 130A-130Z at block 1302. Receipt at block 1252 and block 1302 can include, e.g. receipt of the user interface webpage form that can be provided as part of user interface 500 and/or worker user interface 600 and/or receipt of a text based message can be received from manager system 110 via a text message service. Manager system 110 providing one or more output at block 1107 can include manager system 110 providing visualizations that depict, e.g. comparisons between different workers in respect to the relative determined skill levels.

Figure 7A:
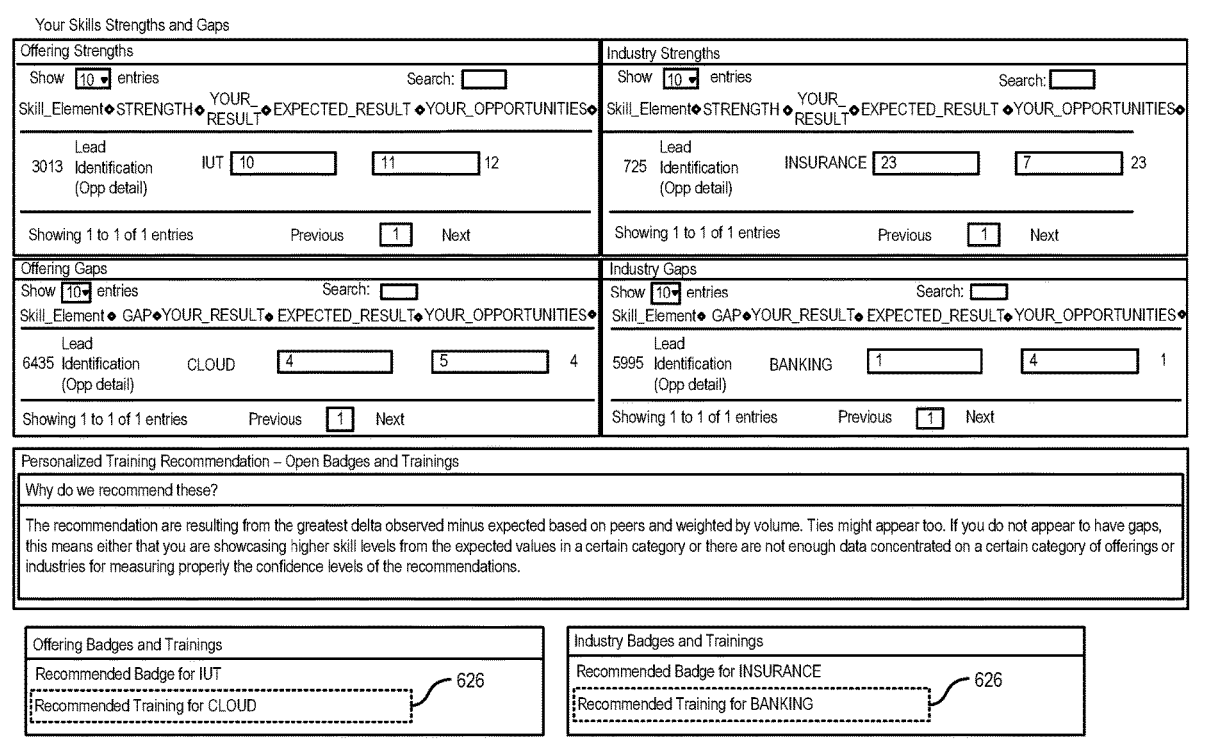
Figure 7B:
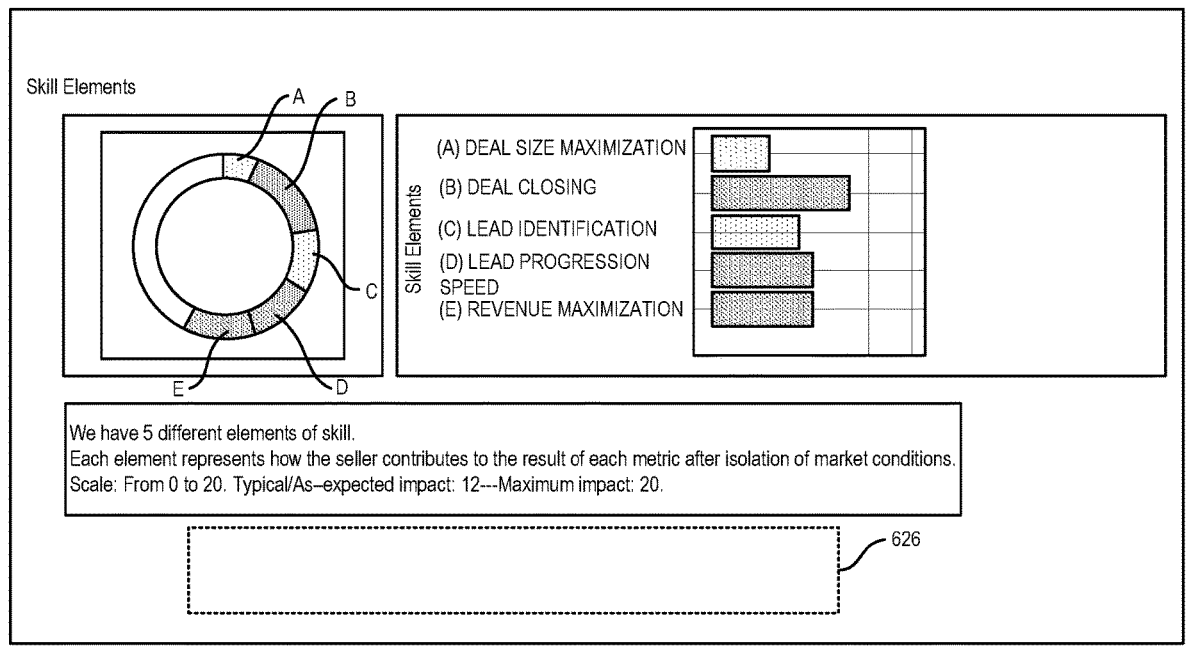
FIG. 7B depicts visualizations of a worker user interface according to one embodiment.
Figure 7C:
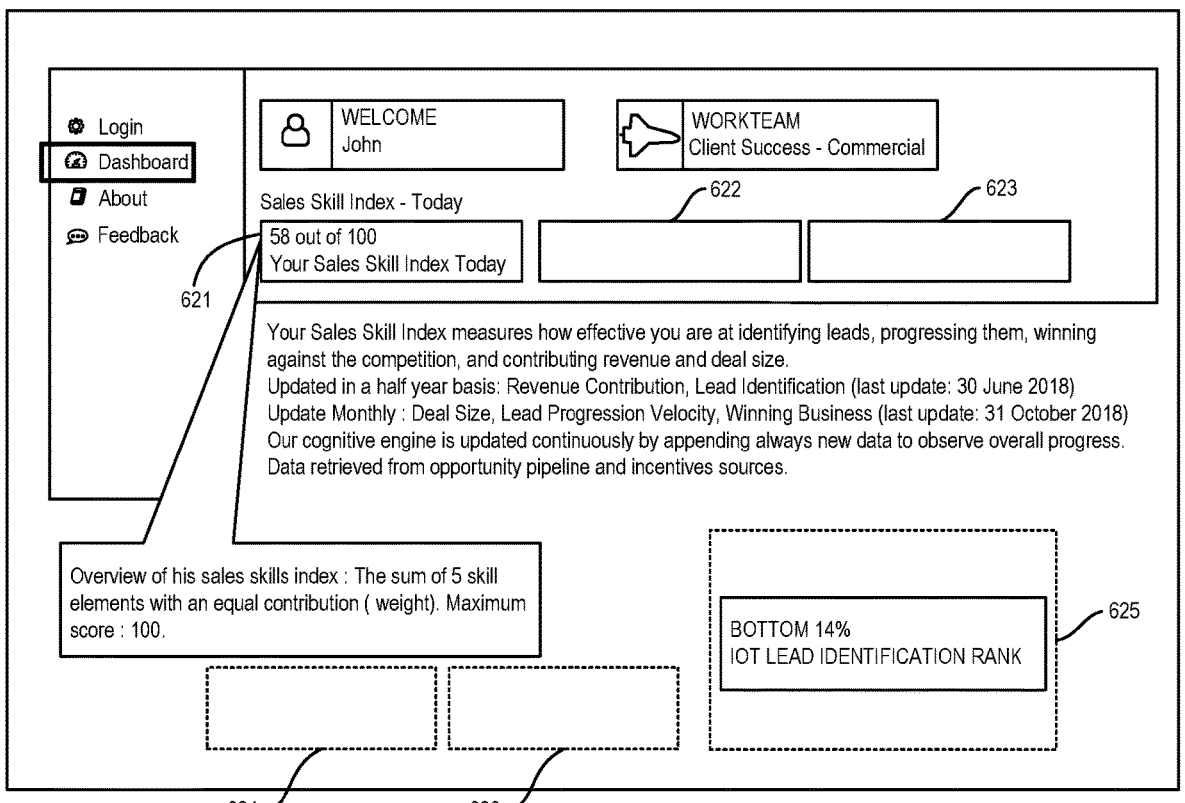
FIG. 7C depicts visualizations of a worker user interface according to one embodiment.
Figure 8:
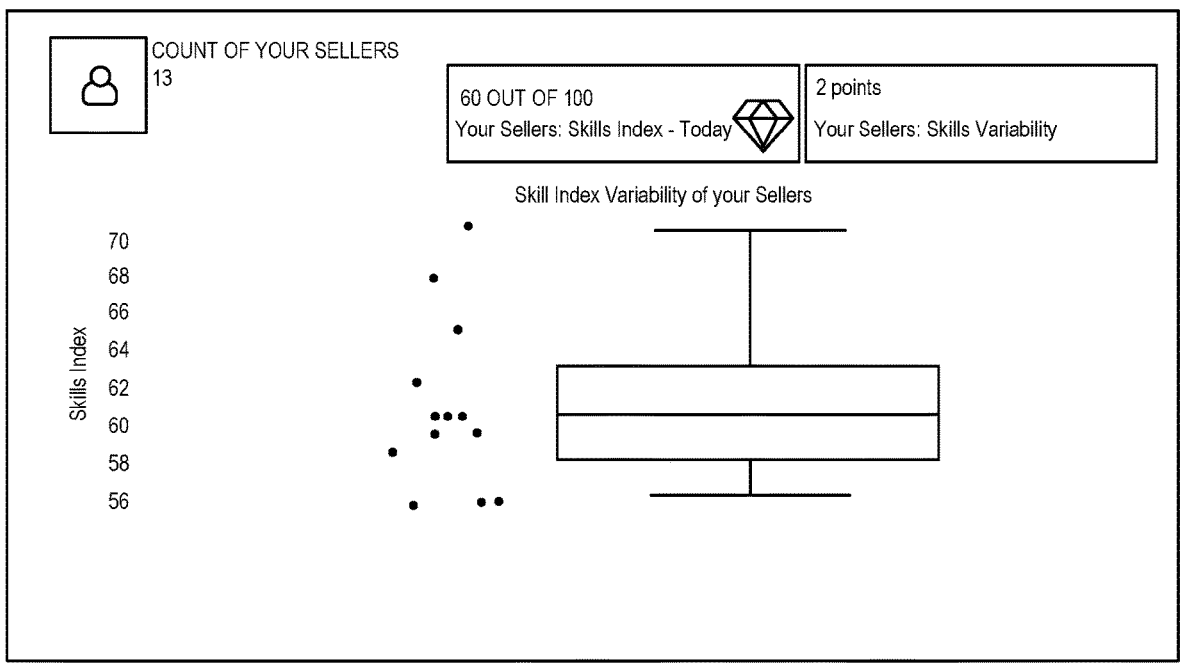
FIG. 8 depicts visualizations of an administrator user interface according to one embodiment.

Examples of visualizations that can be displayed on a displayed user interface of a client computer device 130A-130Z and/or an administrator client computer device 125 are set forth in reference to FIG. 7A-8.

As depicted in FIG. 7A, manager system 110 at block 1107 can provide one or more output to output a worker user interface 600 having visualization features so that a worker can visualize strengths and gaps identified by manager system 110 using a strength and gap identification process as set forth in Tables 6-8. In FIG. 7A there is depicted visualization data for the case that learned models are generated and used for determination of lead identification skill attribute predicted outcome vector Y2.'

As depicted in FIG. 7B, manager system 110 at block 1107 can provide one or more output to output a worker user interface 600 having visualization features so that a certain worker can visualize that certain worker's determined skill attributes and easily determine which skill attributes are relatively strong for the worker and relatively weak for the worker. In one embodiment, manager system 110 can normalize determined random effect skill attribute values and can present the values on a different scale, e.g. so that negative random effect values are presented on a positive number scale. In FIG. 7B manager system 110 can provide visualization data regarding skills attributes determination as determined at block 1105 using model parameterizing and solving.

As depicted in FIG. 7C, manager system 110 at block 1107 can provide one or more output to output a worker user interface 600 having visualization features so that a certain worker can visualize that certain worker's determined skill attributes and easily visualize how those determined skill attributes compare to other workers. Manager system 110 in area 621 can display text depicting an overall skill score for a worker which can be provided as a sum of normalized skill attribute scores. Manager system 110 can determine overall skill scores for all workers and in area 622 can display text specifying the certain worker's percentage rank among all workers. Manager system 110 can determine overall skill scores for all workers and can isolate scores by workteam and in area 623 can display text specifying the certain worker's percentage rank among a workteam to which the worker belongs. Manager system 110 in area 624 can display table data as set forth in Tables 6-8 expanded by being determined for each skill attribute using the learned model determined predicted outcome vectors Y1', Y2', Y3', Y4', Y5'.

As depicted in FIG. 7C, manager system 110 at block 1107 can provide one or more output to output a worker user interface 600 having visualization features so that a certain worker can visualize that certain worker's determined skill attributes and easily visualize how those determined skill attributes compare to other workers. Manager system 110 can use the strength and gap identification processing described in reference to Tables 6-8 to determine particular skill attribute and coefficient value dependent strengths and gaps for all workers and in area 625 can display text specifying the user's rank among other workers for a particular skill attribute in dependence on a particular coefficient value (deal size maximization in dependence on Country-US as shown in Table 6 through to revenue maximization (using predicted outcome Y5') in dependence on Offering-Cloud). Manager system 110 in area 625 can display the certain worker's ranking amongst workers for each determined particular skill attribute and coefficient value dependent strength and gap in a sort order wherein the particular skill attribute and coefficient value dependent determined strength yielding the highest ranking amongst peer workers for the certain worker is displayed first and wherein the particular skill attribute and coefficient value dependent determined gap yielding the lowest ranking amongst peer workers is displayed last in a sort order.

As depicted in FIG. 8, manager system 110 at block 1107 can provide one or more output to output a worker user interface 600 having visualization features so that an administrator can visualize that certain worker's determined skill levels e.g. in terms of skill level attributes or otherwise and can easily visualize how those determined skill levels compare to other workers. Manager system 110 can display in an administrator user interface 500 as shown in FIG. 8 visualization data that depicts e.g. graphically determined overall or generic skill level (e.g. as can be determined by summing normalized skill attribute values) for a set of workers (e.g. all workers, all workers of a particular workteam). User interface 500 as shown in FIG. 8 can be configured so that the graphically depicted data points are active. Manager system 110 can be configured so that by clicking on a graphically depicted data point as shown in FIG. 8 an administrator user can access the visualizations for the particular worker specified by the data point, e.g. and all of the visualization data depicted in reference to worker user interface 600 as described in reference to FIG. 7A-7C for a particular worker can be displayed by administrator user interface 500. Using user interface 500 an administrator user can obtain visualization data for any worker.

One or more output provided at block 1107 by manager system 110 can include one or more output to return a training program decision based on a result of determining block 1105 and/or discriminating block 1106. In one embodiment, manager system 110 can use a decision data structure of decision data structure are 2424 for return of a training program decision.

For example, manager system 110 can use decision data structure to return a deal closing training program decision in response to a worker having an observed deficiency in deal closing, and can return a Lead Identification training program decision in response to a worker having an observed deficiency in lead identification.

In one embodiment, the decision data structure can be a multidimensional decision table in which training program decisions are driven based on multiple conditions being TRUE. For example, manager system 110 using a decision table of decision data structure area 2124 can select for a certain worker the training program identified by the identifier 001 on the basis of (i) the certain worker's "(a) deal size maximization" skill level attribute value being in the range of 0.1 and 0.4 AND (ii) the certain worker's "(b) winning business" skill level attribute value being in the range of (−0.5) and 0.1". According to another example, manager system 110 using a decision table of decision data structure area 2124 can select for a certain worker the training program identified by the identifier 001 on the basis of the certain worker having (i) an identified gap in relation to first coefficient value of a first coefficient, (ii) an identified gap in relation to a second coefficient value of the first coefficient, and (iii) an identified an identified gap in relation to first coefficient value of a second coefficient. Any number of firing conditions can be established in a configured decision table.

Manager system 110 can use a decision data structure of decision data structure area 2124 to return a decision on a training program for a worker. In one embodiment, manager system 110 can use a decision data structure to drive training program decisions based on isolated skills gaps described using the processing set forth in reference to Table 6-8. In one embodiment, manager system 110 can use a decision data structure as set forth in Table 9, wherein training program decisions are based on the attribute area coefficients ranking first and second on the prioritized list of coefficients.

TABLE 9

| Highest ranking attribute coefficient | Second-highest ranking attribute coefficient | Training Program Decision |
| --- | --- | --- |
| . . . | . . . | . . . |
| Deal size maximization - Healthcare (Industry) | Deal size maximization - Offering (Security) | Deal Size Maximization training program |
| Deal size maximization - Healthcare (Industry) | Deal size maximization - Offering (Cloud) | Deal Size Maximization training program |
| . . . | . . . | . . . |
| Deal size maximization - Healthcare (Industry) | Lead identification - Healthcare (Industry) | Healthcare Industry training program |
| . . . | . . . | . . . |

Manager system 110 in reference to Table 9 can return a "skill attribute specific" (e.g. deal size maximization, winning business (closing), lead identification, lead progression speed, revenue maximization) training program decision in the case a worker's largest exhibited gaps are across a skill attribute (e.g. first and second ranked gaps both relate to a common skill attribute) and can return a coefficient value (e.g. first and second ranked gaps have a common coefficient value, e.g. Healthcare, IOT etc.) specific training program in the case a worker's largest exhibited gaps are across a coefficient value (e.g. the Healthcare coefficient value of the Industry coefficient in the described example). It will be seen that a decision data structure can be configured to perform alternative decision logic and that various alternatives are possible. According to one example a first decision data structure can be used to return a primary training program decision and a second decision data structure can be used to return a secondary training program. In one embodiment, a decision data structure can be configured to provide return multiple training program decisions. Logic can be implemented so that training programs are not repeated. Alternative decisions can be configured and a decision data structure can be configured to return decisions based on a greater number of factors or a lesser number of factors.

One or more output provided at block 1107 by manager system 110 can include one or more output to communicate text based content to administrator client computer device 125 and/or client computer devices 130A-130Z that specify a training program for a certain user, e.g. text specifying training program for a user can displayed at area 626 of user interface 600 shown in FIG. 7A-7C. The training program for a certain user can be based on the specific identified strengths and gaps of the certain user, and because system 100 can identify different strengths and gaps for different users, the different training programs can be accurately customized for each user.

One or more output provided at block 1107 by manager system 110 can further include one or more output to perform one or more monitoring process.

One or more output provided at block 1107 by manager system 110 can include one or more output to perform a monitoring process for monitoring compliance with the specified training program. For example, as noted manager system 110 can administer online training and education programs requiring user login, and can also administer training programs at certain physical locations. Manager system 110 can monitor attendance at online tests and can also monitor location services derived data to monitor locations of worker users throughout system 100, e.g. based on the determined locations of the respective client computer devices 130A-130Z and/or based on postings (e.g. calendar and non-calendar) posting of workers on social media system 170. As shown in the flowchart of FIG. 4, manager system 110 at block 1107 can provide one or more output at block 1107 to send monitoring activation configuration data for receipt by a client computer device of client computer devices 130A-130Z at block 1302 so that the client computer device (block 1303) returns returned monitoring data. In the case a worker is away from a training location at a specified time before a training period, there is a risk that the worker user is currently too far away from a training location to arrive at the training location at the specified time. Manager system 110 can send a warning to prompt the worker user to expedite travel to the specified location.

One or more output at block 1107 by manager system 110 can include one or more output to monitor performance of a determined training program based on examination of a solution set of a mixed effect model in which training program participation (for which compliance can be monitored) is expressed as a factor. For example, manager system 110 can add a new factor to a certain model of models area 2122 that has been solved and used for training program identification based on the solution set data. The new factor can be a factor that specifies the certain training program as a factor. The factor FN−1 for the certain training period can have coefficient values ranging from 1 (attended) and 0 (not attended) and random effect vector values for the coefficient values 1 and 0 can be returned by solving the updated model. Manager system 110 can parameterize and solve the updated model in subsequent iterations of determining at block 1105. Manager system 110 can retain a certain training program if the certain training program (within a threshold period of time) produces a threshold exceeding positive random effect. Otherwise manager system 110 can discard the training program and/or replace the training program with a revised training program.

The one or more monitoring process can be a monitoring process to monitor the overall performance of system 100. System 100 can be configured to accurately provide accurate assessments of skill levels and to provide custom designed training and education programs based on the accurate assessments. According to a monitoring process that can be initiated by the one or more output provided at block 1107, in one embodiment, training and education programs specified in one or more output provided at block 1107 can be online training programs that can be monitored by manager system 110.

One or more output at block 1107 by manager system 110 can include one or more output to monitor performance of a decision data structure used to return training program decisions. For example for a first sample of workers, manager system 110 can use the decision data structure logic of Table 8 to return training program decisions for the first sample of workers, and for a second sample set of workers can use an alternative decision data structure configured according to alternative logic (for example may require that the first three rather than the first two gap factors relate to a particular coefficient value before a recommended training program is coefficient value specific). Manager system 110 can add the training program as factor FN−1 in a mixed effect model, and can retain the training program if the certain training program (within a threshold period of time) produces a threshold exceeding positive random effect. Otherwise the certain training program can be discarded e.g. discarded and replaced with a revised training program or discarded without being replaced. Further, manager system 110 can examine random effect values between the first sample and the second sample and in the case of a statistically significantly better performance logic can establish the decision data structure producing the better performance as the primary decision data structure.

Manager system 110 can similarly auto-generate alternative decision data structures for use in new samples of workers and if training programs subject to mixed effect modeling analysis produce better results under alternative decision logic implementations, the decision logic can be iteratively updated over time by machine learning processing described. Using mixed effect model processing and machine learning, manager system 110 can iteratively implement training programs, use mixed effect modeling to ascertain an effect of the training programs e.g. with different decision logic deployments to different samples, and can update decision logic for improved performance iteratively.

Manager system 110 at block 1108 can return to block 1103 and manager system 110 can iterate the process set forth in reference to FIGS. 1103-1108. In one embodiment, manager system 110 can iterate the process set forth in reference to blocks 1103-1108 on an automated basis. In one embodiment, manager system 110 can iterate the process set forth in reference to blocks 1103-1108 using administrator defined configuration data defined by an administrator using administrator user interface 500 (FIG. 5), including with use of scheduling area 512 as set forth herein. There is set forth herein according to one embodiment, method 300 as set forth in reference to FIG. 3, wherein the method includes iteratively performing the parameterizing using updated training data of the historical activities, and iteratively performing the solving and the providing based on the iteratively performed parameterizing and solving so that the one or more output is iteratively updated based on the iteratively performed parameterizing and solving using the updated training data of the historical activities. With each new iteration in one embodiment, manager system 110 can add most recent data to the training data dataset used for parameterizing one or more model without discarding of aged data. In another embodiment, manager system 110 can add most recent data to the training data dataset used for parameterizing one or more model while discarding aged data that is older than a threshold age. In another embodiment, manager system 110 can retain all aged data but manager system 110 can apply weights to data in dependence on age with older data being weighted less than more recent data.

In the example described with reference to Eqs. 2-11, it will be understood that the various chosen vector coefficients, i.e. COUNTRY, INDUSTRY, OFFERING, and WORKTEAM, can be coefficients of importance to a particular enterprise and to a particular classification of work performed by workers at the enterprise.

While a particular embodiment is described it will be appreciated that system 100 can be readily adapted for use in skills profiling and worker training in any enterprise environment, irrespective of the work involved, e.g. from widget building to sales. System 100 can be readily adapted to facilitate worker skill profiling and training in any enterprise based on a self-correcting aspect of system 100. Set forth herein are various models modeling outcomes as a function of factors which can be solved and the data of the solutions provided can be analyzed.

For configuring a model for use, various processes may be employed. In one embodiment for example, an administrator user can examine all of the data available for an enterprise regarding an activity, e.g. widget building or sales, that its workers are involved in and can provide a candidate model having factors corresponding substantially or essentially to each factor for which data is available. An administrator user can use area 510 of administrator user interface 500 to activate parameterizing with training data and solving such a candidate model and the output data can be observed. Based on the output data for a random effect vector having less than a threshold effect (strength) a factor can be discarded, e.g. automatically or based on administrator user configured data configured using user interface 500.

Configuring manager system 110 for skills learning and/or discrimination in any generic application can include functions as follows. (1) Identify the set of workers W to include in the analysis. Each worker in W has a unique identifier. (2) Each worker in W has a set of attributes that characterize the worker, such as his/her role/workteam/specialty, incentive plan, years of experience, etc. Some of the worker attributes affect the type of work they do and/or the expected outcomes from their work. Some worker attributes speak to their experience. Identify the measurable worker attributes WA that can be used to identify each worker's peers, with similar roles and levels of experience. (3) Identify the set of work activities A performed by the workers in the set W over a defined period of time T. An activity may refer to a widget to make, a widget to repair, a lead passed to a seller for a sales opportunity around a product and a client, or something else. (4) Each activity in A is associated by a worker in W and has a set of attributes that characterize the activity, such as the type of activity, its complexity, and the skills it requires. Some of the activity attributes affect the required skills and/or the expected outcomes from the work. For example, the type of widget, the type of repair, the type of product to sell, the type of client to sell to, etc. Identify those measurable activity attributes AA that directly or indirectly affect the required skills and/or the expected outcomes from the work. (5) Each activity in A is associated with a set of metrics that characterize the outcomes of the worker's work on the activity, such as the successful completion of the activity or failure, the quality of the work, the value of the activity to the enterprise, the revenue it generated, the time or work effort consumed, etc. Identify those activity metrics AM that quantify the outcomes of the worker's work on an activity. (6) Note, each activity metric in AM associated with a core performance skill. For example, the skill to "repair widgets quickly" for activity "repair widget" and metric "time consumed." Name the core performance skills in AM to assess workers on. (7) Note, each activity attribute in AA associated with a skill area. For example, skills pertaining to "repairing widgets of type X" and "repairing failures of type Y" for the activity "repair widget" and activity attributes "widget type X" and "failure type Y". Name the skill areas in AA to assess workers on. (8) Parameterize a model of the general form as set forth in Eq. 1 or Y=activity factor(s)+worker factor+$\varepsilon$. For each activity metric Y in AM, including all the identified worker attributes WA as worker activity factors, and all the identified general activity attributes AA as general activity factors. The term for the worker factor in the model can capture any patterns of over or under-performance, relative to the benchmark established by the worker's peers, that is not explained by any of the other factors, and thus assess the worker's core performance skill associated with Y, and the uncertainty surrounding this assessment considering the effects of chance. (9) Solve each of the models using the observed activities in A to assess each of the core performance skills in AM for each worker in W. Select the subset of significant core skill assessments for each worker for further analysis, where the likelihood of a performance pattern due to chance is below a given threshold. (10) Analyze each of the significant core performance skill assessments to assess the contributing skill areas in AA associated with the over- or under-performance patterns, e.g. performing the skills discriminating process using learned models as described in connection with Tables 6-8. (11) Summarize the core performance skill gaps for each worker, in the context of the benchmark skills and outcomes as set by the worker's peers. For each core performance skill gap, provide personalized training recommendations on how to close the gaps, by presenting the contributing skill areas. (12) Reassess skills on a periodic schedule to continuously refine the assessments and training recommendations based on the latest activities and outcomes of each worker and to prompt for continuous improvement in worker skill. To do so, re-perform Function 9 after a set elapsed time, as appropriate for the volume and type of activities in the course of business.

Manager system 110 can be configured to perform each of the functions (1) through (12) automatically on an iterative basis with each function being responsive to completion of a prior described function. In some embodiments, operations of manager system 110 can be in dependence on configuration data defined by an administrator user and/or a worker user using a user interface, e.g. area 512 of administrator user interface 500 (FIG. 5).

Certain embodiments herein may offer various technical computing advantages, involving computing advantages to address problems arising in the realm of computer technology. (AI) artificial intelligence technologies aim to observe an environment and take action that maximizes a likelihood of success. Embodiment herein employ (AI) technologies including machine learning to replace flawed subjective decision making characterizing managerial worker skills assessments. Embodiments herein can replace and improve upon human cognitive decision making process by the removal of subjective elements. In one aspect embodiments herein can provide decisions incapable of being provided by humans by the removal of subjective elements. In some embodiments models including mixed effect models can be employed to model activities involving work by workers. Data specifying known past historical occurrences can be applied as training data to parameterize the models, and models can be solved by machine learning for objective learning of a workers' skill level. Values learned by model solving can be used to provide one or more output, including one or more output to activate one or more process. Learned model processing can be used to discriminate aspects of worker skill. Machine learning processes e.g. involving use of models and updating decision data structures can be performed for increased accuracy and for reduction of reliance on rules based criteria and thus reduced computational overhead. Machine learning processes can be iterated using updated training data for improved accuracy and other performance parameters over time.

Figure 9:
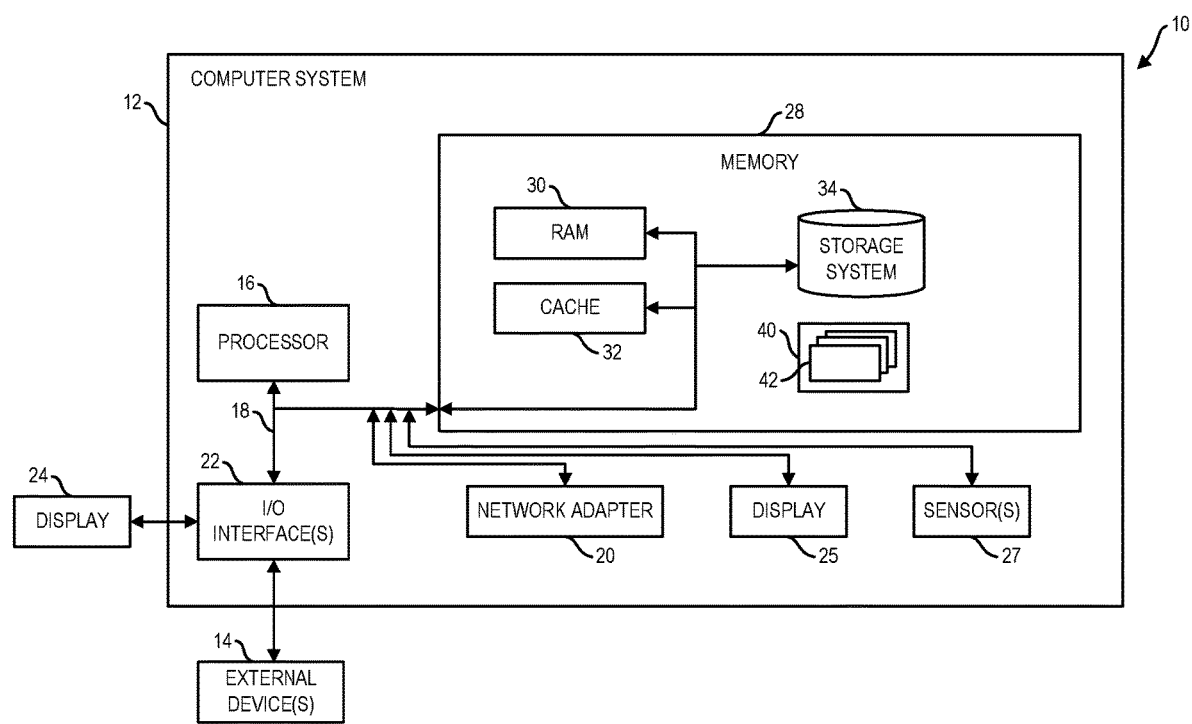
FIG. 9 depicts a computing node according to one embodiment.
Figure 10:
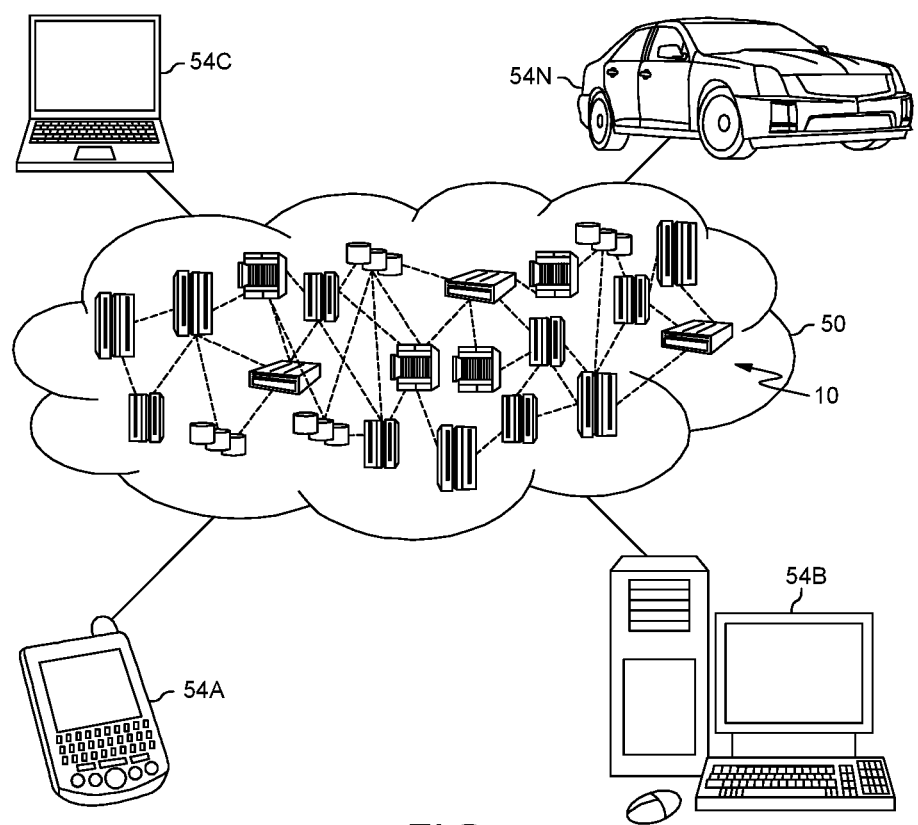
FIG. 10 depicts a cloud computing environment according to one embodiment.
Figure 11:
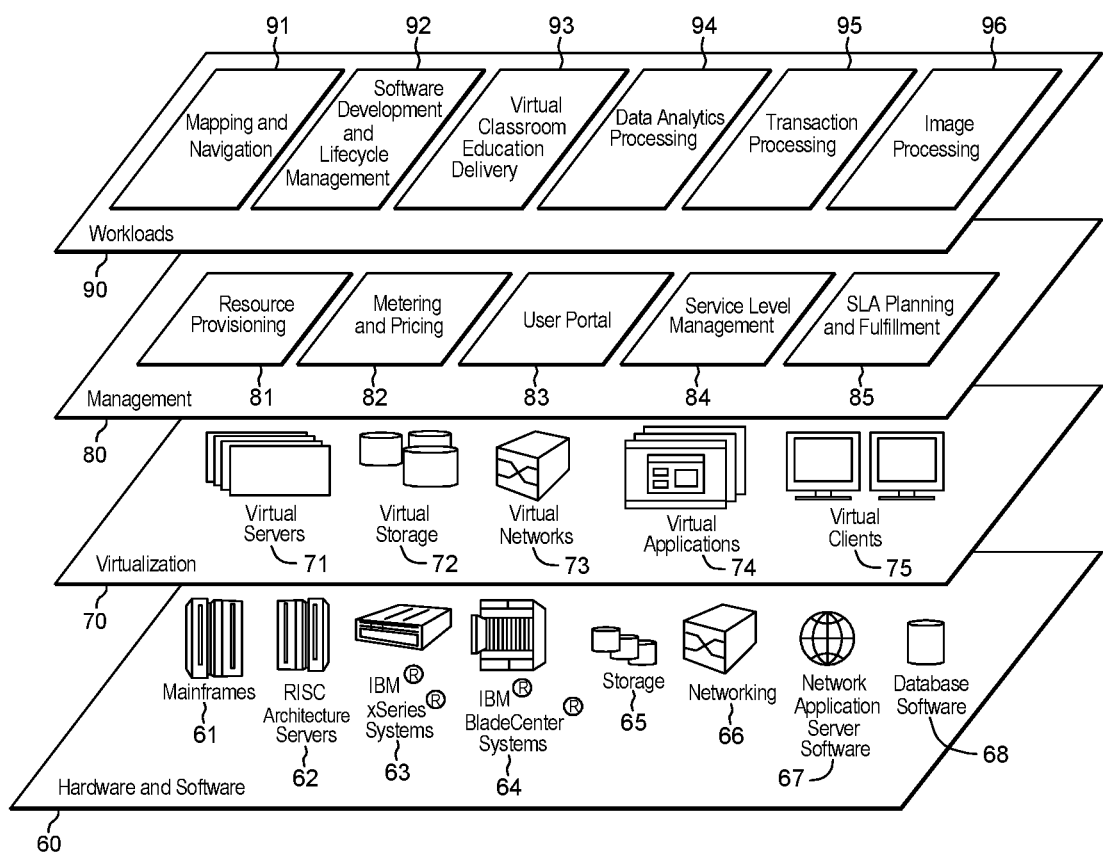
FIG. 11 depicts abstraction model layers according to one embodiment.

FIGS. 9-11 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 9, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 9, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 10-11.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 2, for performing functions described with reference to method 300 of FIG. 3, and the functions described with reference to manager system 110 as set forth in the flowchart of FIG. 4. In one embodiment, social media system 170 can include one or more computing node 10 and can include one or more program 40 for performing functions described with reference to social media system 170 as set forth in the flowchart of FIG. 4. In one embodiment, one or more of client computer devices 130A-130Z can include one or more computing node 10 and can include one or more program 40 for performing functions described with reference to one or more of client computer devices 130A-130Z as set forth in the flowchart of FIG. 4.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 10 computing node 10 is described as being implemented in a cloud computing environment and accordingly is referred to as a cloud computing node in the context of FIG. 10.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for facilitating performance of skills determination and/or discrimination as set forth herein. The processing components 96 can be implemented with use of one or more program 40 described in FIG. 9.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:

parameterizing, by one or more processor, with training data one or more model that expresses, for a set of historical activities, a known outcome as a function of a plurality of factors, the plurality of factors including one or more activity factor and a worker factor, wherein the one or more activity factor is expressed, for the set of historical activities, with one or more known activity factor coefficient vector associated to the set of historical activities and one or more activity factor random effect vector associated to the set of historical activities, wherein the worker factor is expressed, for the set of historical activities, with a known coefficient vector provided by a set of worker identifiers identifying workers associated to the set of historical activities a worker factor random effect vector associated to the set of historical activities;

solving, by the one or more processor, the one or more model to learn by machine learning values of the worker random effect vector associated to the set of historical activities, wherein the values of the worker random effect vector provide an indication of learned worker skill level for respective workers identified by the worker identifiers; and providing, by the one or more processor, one or more output based on the solving.

2. The method of claim 1, wherein the method includes iteratively performing the parameterizing using updated training data of the historical activities, and iteratively performing the solving and the providing based on the iteratively performed parameterizing and solving so that the one or more output is iteratively updated based on the iteratively performed parameterizing and solving.

3. The method of claim 1, wherein the method includes applying a learned model to isolate a contribution of one or more activity factor of the plurality of factors on at least one value of the learned values of the worker random effect vector, and wherein the providing the one or more output includes providing one or more output based on the applying a learned model.

4. The method of claim 1, wherein the one or more output includes an output to return a decision on a training program, and one or more output to initiate a process for monitoring for compliance with the training program.

5. The method of claim 1, wherein the one or more output includes an output to return a decision on a training program, and an output to specify the training program as a training program activity factor in an updated mixed effect model, the method including solving the updated mixed effect model to yield a random effect vector value indicating a strength of an effect of the training program, determining that the strength is less than a threshold and discarding the training program based on the strength being less than the threshold.

6. The method of claim 1, wherein the method includes applying a learned model to isolate a contribution of one or more activity factor of the plurality of factors on at least one value of the learned values of the worker random effect vector, wherein generating the learned model includes solving an adapted one or more model adapted from the one or more model by removing the worker factor from the one or more model and inputting solution set data yielded by solving the adapted model into a series of equations defining the adapted model to determine a predicted outcome vector defining the learned model, wherein the applying a learned model includes computing differences using the predicted outcome vector and an outcome vector of the one or more model, and wherein the providing the one or more output includes providing one or more output based on the applying a learned model.

7. The method of claim 1, wherein the method includes applying a learned model to isolate a contribution of one or more activity factor of the plurality of factors on at least one value of the learned values of the worker random effect vector, wherein generating the learned model includes inputting mixed effect model solution set data into a series of equations defining a mixed effect model to determine a predicted outcome vector and computing differences using the predicted outcome vector and an outcome vector of the one or more model, and wherein the providing the one or more output includes providing one or more output based on the applying a learned model.

8. The method of claim 1, wherein the one or more output includes an output to return a decision on a training program, and one or more output to initiate a process for monitoring for compliance with the training program, wherein the monitoring includes one or more of the following selected from the group consisting of (a) examining attendance data of an online administered training program, (b) examining location data received from a client computer device of a worker assigned to the training program; and (c) examining social media content of a worker assigned to the training program.

9. The method of claim 1, wherein the method includes establishing the one or more model based on configuration data defined by a user using a user interface that permits a user to specify a candidate factor, and wherein the method includes solving a candidate model having the candidate factor, determining that solution data yielded by solving the candidate model indicating an effect of the candidate factor exceeds a strength threshold, and updating the one or more model to include the candidate factor based on the determining that solution data yielded by solving the candidate model indicating an effect of the candidate factor exceeds a strength threshold.

10. The method of claim 1, wherein the method includes establishing the one or more model based on configuration data defined by a user using a worker user interface that permits a worker user to specify a candidate factor, and wherein the method includes solving a candidate model having the candidate factor, determining that solution data yielded by solving the candidate model indicating an effect of the candidate factor exceeds a strength threshold, and updating the one or more model to include the candidate factor based on the determining that solution data yielded by solving the candidate model indicating an effect of the candidate factor exceeds a strength threshold.

11. The method of claim 1, wherein the method includes applying a learned model to isolate a contribution of one or more activity factor of the plurality of factors on at least one value of the learned values of the worker random effect vector, and wherein the providing the one or more output includes providing one or more output based on the applying a learned model, wherein the one or more output includes an output to return a decision on a training program, and one or more output to initiate a process for monitoring for compliance with the training program, wherein the monitoring includes each of (a) examining attendance data of an online administered training program, (b) examining location data received from a client computer device of a worker assigned to the training program; and (c) examining social media content of a worker assigned to the training program.

12. The method of claim 1, wherein the method includes applying a learned model to isolate a contribution of one or more activity factor of the plurality of factors on at least one value of the learned values of the worker random effect vector, wherein generating the learned model includes inputting mixed effect model solution set data into a series of equations defining a mixed effect model to determine a predicted outcome vector and computing differences using the predicted outcome vector and an outcome vector of the one or more model, and wherein the providing the one or more output includes providing one or more output based on the applying a learned model, wherein the method includes establishing the one or more model based on configuration data defined by a user using a user interface that permits a user to specify a candidate factor, and wherein the method includes solving a candidate model having the candidate factor, determining that solution data yielded by solving the candidate model exceeds a strength threshold, and updating the one or more model to include the candidate factor based on the determining that solution data yielded by solving the candidate model exceeds a strength threshold.

13. The method of claim 1, wherein the method includes applying a learned model to isolate a contribution of one or more activity factor of the plurality of factors on at least one value of the learned values of the worker random effect vector, wherein generating the learned model includes inputting mixed effect model solution set data into a series of equations defining a mixed effect model to determine a predicted outcome vector and computing differences using the predicted outcome vector and an outcome vector of the one or more model, and wherein the providing the one or more output includes providing one or more output based on the applying a learned model to display on a display visualization data that depicts strength and gaps of one or more worker.

14. The method of claim 1, wherein the parameterizing with training data one or more model includes parameterizing Z mixed effect models, wherein the solving includes solving the Z mixed effect models, the Z mixed effect models being configured for extraction of skill attribute data for Z skill attributes, wherein the method includes applying a learned model to isolate a contribution of one or more activity factor of the plurality of factors on at least one value of the learned values of the worker random effect vector, wherein generating the learned model includes inputting mixed effect model solution set data into a series of equations defining a mixed effect model to determine a predicted outcome vector and computing differences using the predicted outcome vector and an outcome vector of the one or more model, and wherein the providing the one or more output includes providing one or more output based on the applying a learned model, wherein the one or more output includes an output, based on the applying a learned model, to display on a display visualization data that depicts strength and gaps of one or more worker, wherein the one or more output includes an output, based on the applying a learned model, to return a decision on a training program, and an output, based on the applying a learned model, to initiate a process for monitoring for compliance with the training program, output to specify the training program as a training program activity factor in an updated mixed effect model, the method including solving the updated mixed effect model to yield a random effect vector value indicating a strength of an effect of the training program, determining that the strength is less than a threshold and discarding the training program based on the strength being less than the threshold, wherein the method includes establishing the one or more model based on configuration data defined by a user using a worker user interface that permits a worker user to specify a candidate factor, and wherein the method includes solving a candidate model having the candidate factor, determining that solution data yielded by solving the candidate model indicating an effect of the candidate factor exceeds a strength threshold, and updating the one or more model to include the candidate factor based on the determining that solution data yielded by solving the candidate model exceeds a strength threshold, wherein the method includes iteratively performing the parameterizing using updated data of the historical activities, and iteratively performing the solving and the providing based on the iteratively performed parameterizing so that the one or more output is iteratively updated based on the iteratively performed parameterizing and solving based on the updated data of the historical activities.

15. The method of claim 1, wherein the method includes inputting solution data yielded by solving an adapted model into a series of equations defining the adapted model to determine a predicted outcome vector, wherein the adapted model is adapted from the one or more model, and wherein the providing the one or more output is in dependence on the predicted outcome vector.

16. The method of claim 1, wherein the method includes inputting solution data from the solving into a series of equations defining the one or more model to determine a predicted outcome vector, and wherein the providing the one or more output is in dependence on the predicted outcome vector.

17. The method of claim 1, wherein the method includes updating the one or more model to include a candidate factor based on an examining of solution data yielded by solving a candidate model having the candidate factor, wherein the examining indicates that an effect of the candidate factor exceeds a strength threshold.

18. A computer program product comprising:
a computer readable storage medium readable by one or more processing circuit and storing instructions for execution by one or more processor for performing a method comprising:
parameterizing with training data one or more model that expresses, for a set of historical activities, a known outcome as a function of a plurality of factors, the plurality of factors including one or more activity factor and a worker factor, wherein the one or more activity factor is expressed, for the set of historical activities, with one or more known activity factor coefficient vector associated to the set of historical activities and one or more activity factor random effect vector associated to the set of historical activities, wherein the worker factor is expressed, for the set of historical activities, with a known coefficient vector provided by a set of worker identifiers identifying workers associated to the set of historical activities a worker factor random effect vector associated to the set of historical activities;
solving the one or more model to learn by machine learning values of the worker random effect vector associated to the set of historical activities, wherein the values of the worker random effect vector provide an indication of learned worker skill level for respective workers identified by the worker identifiers; and
providing one or more output based on the solving.

19. The computer program product of claim 18, wherein the parameterizing with training data one or more model includes parameterizing Z mixed effect models, wherein the solving includes solving the Z mixed effect models, the Z mixed effect models being configured for extraction of skill attribute data for Z skill attributes, wherein the method includes applying a learned model to isolate a contribution of one or more activity factor of the plurality of factors on at least one value of the learned values of the worker random effect vector, wherein generating the learned model includes inputting mixed effect model solution set data into a series of equations defining a mixed effect model to determine a predicted outcome vector and computing differences using the predicted outcome vector and an outcome vector of the one or more model, and wherein the providing the one or more output includes providing one or more output based on the applying a learned model, wherein the one or more output includes an output, based on the applying a learned model, to display on a display visualization data that depicts strength and gaps of one or more worker, wherein the one or more output includes an output, based on the applying a learned model, to return a decision on a training program, and an output, based on the applying a learned model, to initiate a process for monitoring for compliance with the training program, output to specify the training program as a training program activity factor in an updated mixed effect model, the method including solving the updated mixed effect model to yield a random effect vector value indicating a strength of an effect of the training program, determining that the strength is less than a threshold and discarding the training program based on the strength being less than the threshold, wherein the method includes establishing the one or more model based on configuration data defined by a user using a worker user interface that permits a worker user to specify a candidate factor, and wherein the method includes solving a candidate model having the candidate factor, determining that solution data yielded by solving the candidate model indicating an effect of the candidate factor exceeds a strength threshold, and updating the one or more model to include the candidate factor based on the determining that solution data yielded by solving the candidate model exceeds a strength threshold, wherein the method includes iteratively performing the parameterizing using updated data of the historical activities, and iteratively performing the solving and the providing based on the iteratively performed parameterizing so that the one or more output is iteratively updated based on the iteratively performed parameterizing and solving based on the updated data of the historical activities.

20. A system comprising:
a memory;
at least one processor in communication with the memory; and program instructions executable by one or more processor via the memory to perform a method comprising:

parameterizing with training data one or more model that expresses, for a set of historical activities, a known outcome as a function of a plurality of factors, the plurality of factors including one or more activity factor and a worker factor, wherein the one or more activity factor is expressed, for the set of historical activities, with one or more known activity factor coefficient vector associated to the set of historical activities and one or more activity factor random effect vector associated to the set of historical activities, wherein the worker factor is expressed, for the set of historical activities, with a known coefficient vector provided by a set of worker identifiers identifying workers associated to the set of historical activities a worker factor random effect vector associated to the set of historical activities;

solving the one or more model to learn by machine learning values of the worker random effect vector associated to the set of historical activities, wherein the values of the worker random effect vector provide an indication of learned worker skill level for respective workers identified by the worker identifiers; and providing one or more output based on the solving.

* * * * *